(12) United States Patent
Fitzmaurice et al.

(10) Patent No.: US 7,663,605 B2
(45) Date of Patent: Feb. 16, 2010

(54) BIOMECHANICAL USER INTERFACE ELEMENTS FOR PEN-BASED COMPUTERS

(75) Inventors: George Fitzmaurice, Toronto (CA); Gordon Kurtenbach, Toronto (CA)

(73) Assignee: Autodesk, Inc., San Rafael, CA (US)

( * ) Notice: Subject to any disclaimer, the term of this patent is extended or adjusted under 35 U.S.C. 154(b) by 338 days.

(21) Appl. No.: 10/748,684

(22) Filed: Dec. 31, 2003

(65) Prior Publication Data

US 2004/0212605 A1 Oct. 28, 2004

Related U.S. Application Data

(60) Provisional application No. 60/438,499, filed on Jan. 8, 2003.

(51) Int. Cl.
*G06F 3/00* (2006.01)

(52) U.S. Cl. ............ 345/173; 715/789; 715/811; 715/866

(58) Field of Classification Search ............ 345/184, 345/173, 179, 156; 715/700, 789, 811, 866
See application file for complete search history.

(56) References Cited

U.S. PATENT DOCUMENTS

| | | | |
|---|---|---|---|
| 5,559,944 A * | 9/1996 | Ono | 715/841 |
| 5,689,667 A * | 11/1997 | Kurtenbach | 715/810 |
| 5,809,498 A | 9/1998 | Lopresti et al. | |
| 5,821,926 A | 10/1998 | Arita | |
| 5,828,360 A * | 10/1998 | Anderson et al. | 715/834 |
| 5,933,143 A | 8/1999 | Kobayashi | |
| 6,005,549 A | 12/1999 | Forest | |
| 6,031,529 A | 2/2000 | Migos et al. | |
| 6,281,420 B1 | 8/2001 | Suzuki et al. | |
| 6,317,142 B1 | 11/2001 | Decoste et al. | |
| 6,448,987 B1 * | 9/2002 | Easty et al. | 715/834 |
| 6,760,049 B1 | 7/2004 | Todd | |
| 6,819,990 B2 | 11/2004 | Ichinose | |

(Continued)

OTHER PUBLICATIONS

Adobe Photoshop—Product Overview, http://www.adobe.com/products/photoshop/overview.htm.

(Continued)

*Primary Examiner*—Amr Awad
*Assistant Examiner*—Stephen G Sherman
(74) *Attorney, Agent, or Firm*—Staas & Halsey LLP

(57) ABSTRACT

The present invention is a system that uses natural user position and natural user motion to position and layout interface elements for a pen-based computer display. Graphical user interfaces, such as a slider or menu, are popped-up at a position convenient to the user, such as at the current position of the cursor. A rectilinear interface is oriented along a natural motion arc of the user, such as an elbow arc. An arc shaped interface can also be positioned along a natural motion arc, such as the elbow arc, and be shaped according the elbow are or be shaped by another natural motion arc such as a wrist arc of the user. The interface arc, whether shaping or orienting the interface, can be a single motion arc, such as an elbow arc, a composite arc of an elbow arc and a wrist arc, a sequence of an elbow arc and a wrist arc, a compound arc where an elbow arc blends into a wrist arc or an arc followed by a linear interface section.

41 Claims, 26 Drawing Sheets

U.S. PATENT DOCUMENTS

| | | | |
|---|---|---|---|
| 6,883,143 B2* | 4/2005 | Driskell | 715/763 |
| 6,918,091 B2* | 7/2005 | Leavitt et al. | 715/765 |
| 7,058,902 B2* | 6/2006 | Iwema et al. | 715/810 |
| 2002/0054175 A1* | 5/2002 | Miettinen et al. | 345/863 |
| 2002/0122072 A1* | 9/2002 | Selker | 345/834 |
| 2002/0171690 A1 | 11/2002 | Fox et al. | |
| 2004/0189724 A1* | 9/2004 | Golibrodski et al. | 345/964 |
| 2006/0136840 A1* | 6/2006 | Keely et al. | 715/808 |

OTHER PUBLICATIONS

Jasc Software—Introduction to Layers, http://www.jasc.com/tutorials/layers.asp.

The International Searching Authority issued a "Notification of Transmittal of the International Search Report and the Written Opinion of the International Searching Authority" on May 5, 2008 related to International Application No. PCT/US04/00162.

* cited by examiner

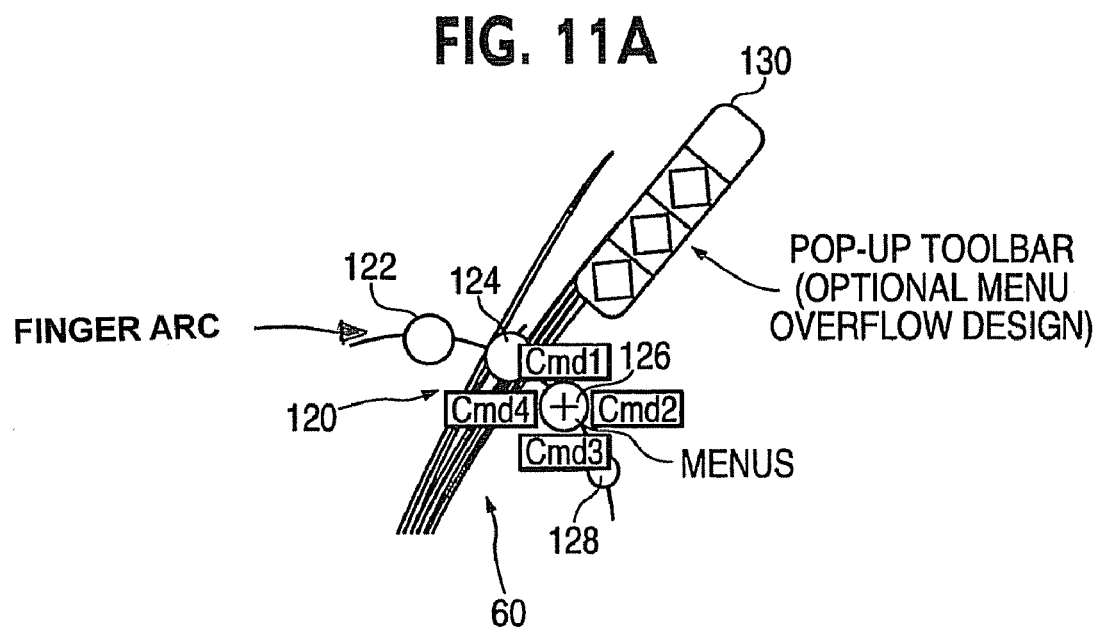

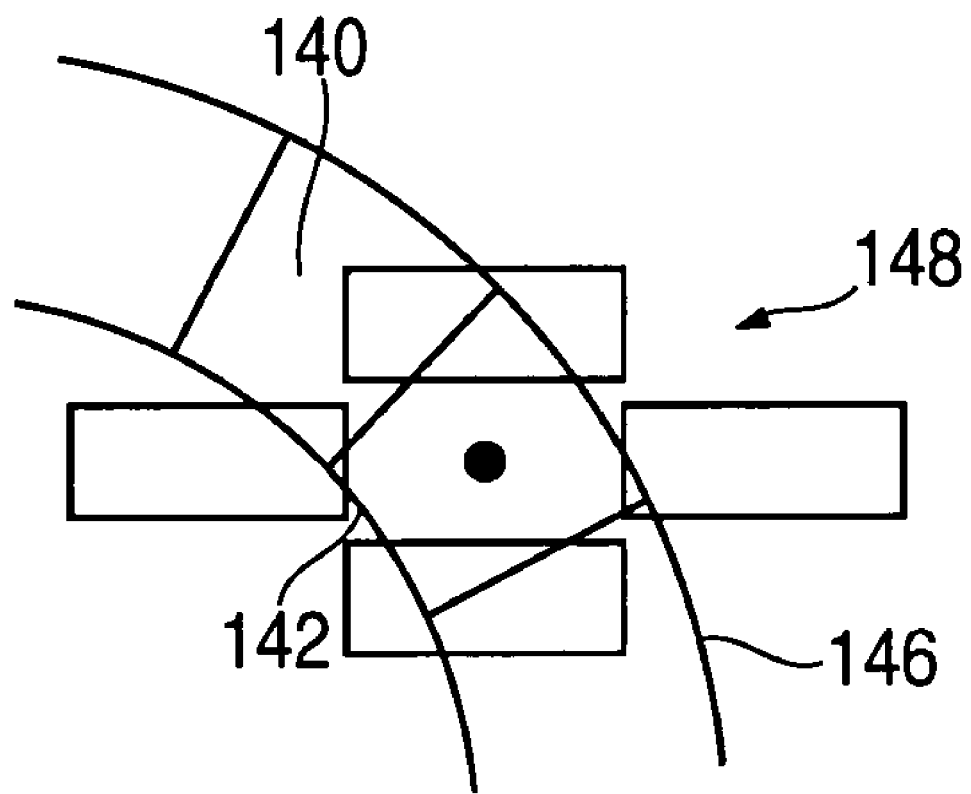

FIG. 16
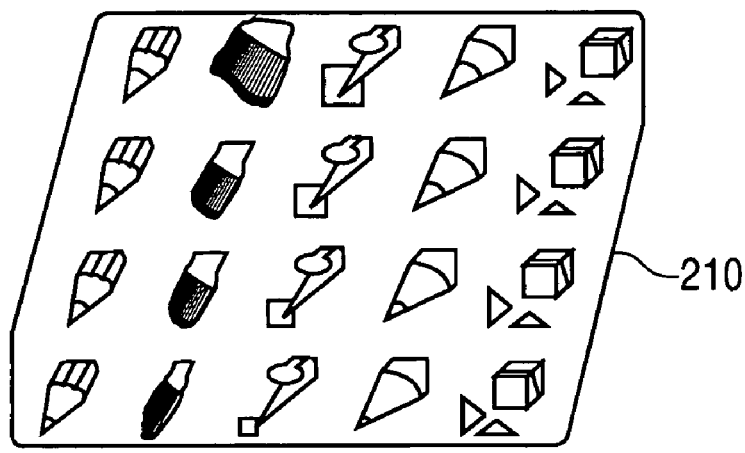

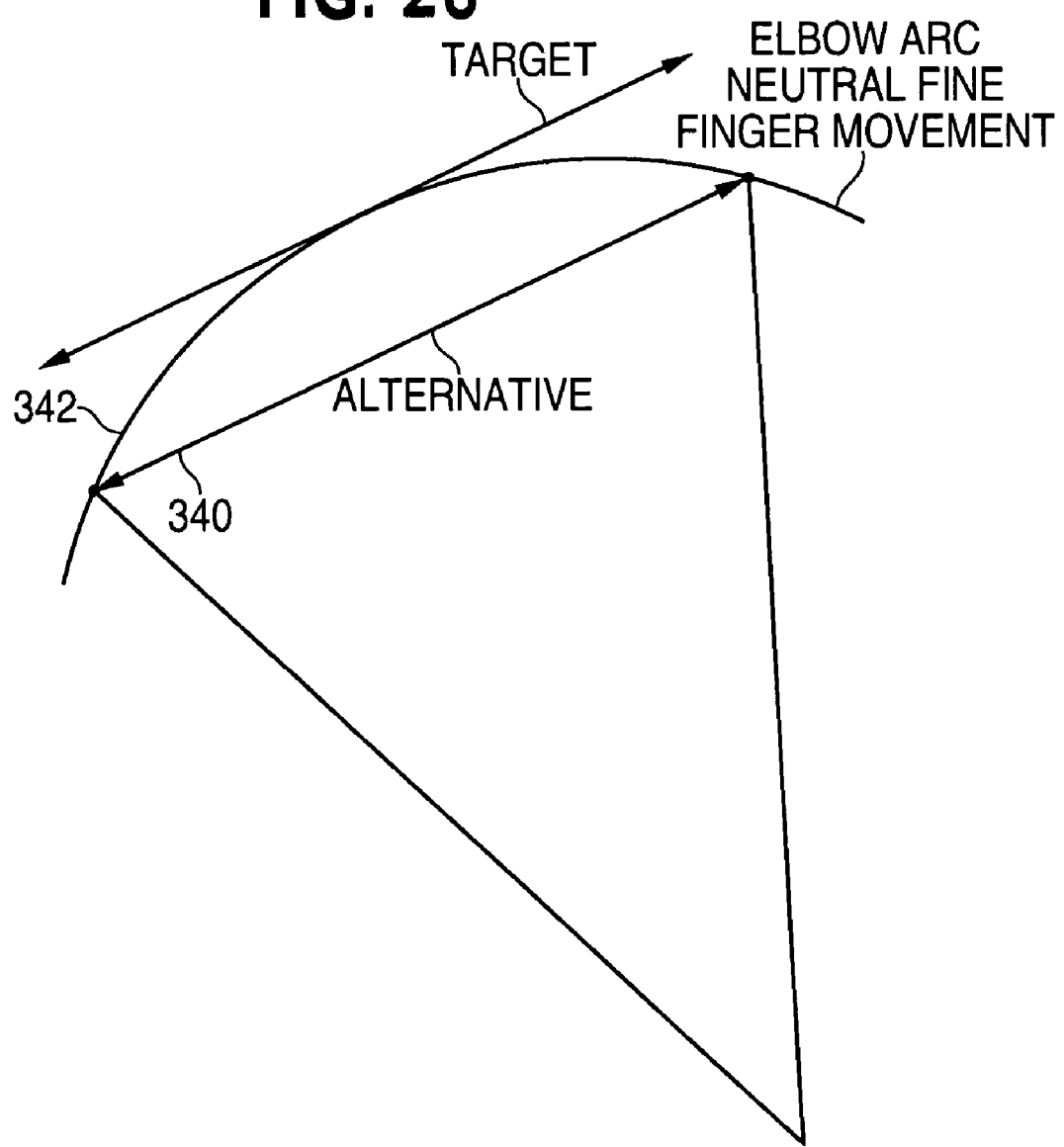

BIOMECHANICAL USER INTERFACE ELEMENTS FOR PEN-BASED COMPUTERS

CROSS-REFERENCE TO RELATED APPLICATION(S)

This application is related to and claims priority to U.S. provisional application entitled "User Interface Techniques For Pen-Based Computers" having Ser. No. 60/438,499, by Fitzmaurice et al, filed Jan. 8, 2003; this application is related to U.S. application entitled "A Layer Editor System For A Pen-Based Computer" having Ser. No. 10/748,685, by Fitzmaurice et al, filed Jan. 31, 2003; and this application is related to U.S. application entitled "A User Interface Having A Placement And Layout Suitable For Pen-Based Computers" having Ser. No. 10/748,686, by Fitzmaurice et al, filed Jan. 31, 2003; and all of which are incorporated by reference herein.

BACKGROUND OF THE INVENTION

1. Field of the Invention

The present invention is directed to interface elements oriented and/or shaped in accordance with a natural motion of a user, such as conforming to an arc made by the hand when the elbow is pivoted and, more particularly, to a system that positions interface elements at a position determined by the hand position of the user, allowing the interface to pop-up where it is comfortable to use and lays out the interface elements according to a natural arc that is also easy to use.

2. Description of the Related Art

Pen or stylus based computers, such as tablet personal computers (PCs) and personal digital assistants (PDAs), are becoming popular. These computers typically allow the user to interact with the computer through a graphical user interface using a stylus or pen (or possibly even a finger). A keyboard and a mouse are typically not available. Pen-based type interaction can be limiting as compared to other types of interaction, such as using the mouse or the keyboard, alone or in combination. What is needed are improvements to the interaction capability of pen-based computers.

Operating pen-based user interfaces in the tablet-PC form factor can be extremely awkward and uncomfortable. Repetitive actions are common and operating the user interface along the borders of the screen is problematic. First, the digitizer behaves poorly around the borders of the screen and thus it is hard to control the cursor using the stylus. Secondly, positioning the hand along the digitizer edge can be uncomfortable and unstable to operate with precision. What is needed are solutions that employ a design that moves away from the digitizer edge and adheres to comfortable human motions.

Typical interface elements, such as a slider or a menu, are rectilinearly oriented, such as oriented horizontally and/or vertically relative to the display. Using such interface elements with a pen typically requires a compound movement by the user that may include rotating at the shoulder to essentially slide the elbow, pivoting the elbow during the sliding motion and rotating the wrist at the same time. Such compound movements are more difficult than simple movements, such as pivoting at the elbow, and can cause fatigue in the user when receptively done. What is needed is an interface element that conforms to more natural simple motions by the user.

SUMMARY OF THE INVENTION

It is an aspect of the present invention to provide interface elements at a comfortable and convenient position for a user of a pen-based computer.

It is another aspect of the present invention to provide interface elements that are oriented and shaped by natural motion arcs of the users hand, elbow and/or shoulder.

It is a further aspect of the present invention to layout or design interface elements that take advantage of natural use motions.

The above aspects can be attained by a system that uses natural user position and natural user motion to position and layout interface elements for a pen-based computer display. Graphical user interfaces, such as a slider or menu, are popped-up at a position convenient to the user, such as at the current position of the cursor. The interface is oriented along or shaped like a natural motion arc of the user. The interface arc can be a single motion arc, such as an elbow arc, a composite arc of an elbow arc and a wrist arc, a sequence of an elbow arc and a wrist arc, a compound where an elbow arc blends into a wrist arc or an arc followed by a linear interface. The arc is set by allowing a user to draw strokes on a display and the arc is determined based on the strokes.

These together with other aspects and advantages that will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIGS. 11A and 11B show pop-up menus with rectilinear and arc shaped elements.

FIG. 12 shows arc influenced control zones.

FIG. 16 depicts an arc influenced overflow palette.

FIG. 26 shows an alternative positioning of a linear arc oriented interface.

DETAILED DESCRIPTION OF THE PREFERRED EMBODIMENTS

The present invention provides an improved interface element for pen-based type computers by altering the shape of the user interface widgets, positioning them away from the edge of the screen and conforming them to the biomechanics of the human body. Simply put, the present invention provides interface widgets that are reshaped into or reoriented along "arc" shapes or arc like curves. For example, a slider control may not be straight or rectilinear but instead have a curved shape. Or the slider can be oriented along a particular portion of an arc. A row of button controls (such as in a toolbox) can also follow this arc shape. These interface elements or controls, sometimes called widgets, can be implemented using conventional bitmap graphics (or any other graphics drawing system such as vector graphics) with irregular hit or activation zones defined (such as, curved hit zones). Detection of the selection of a control (hit detection) can be efficiently performed by defining an internal data structure that is also a bitmap that matches the shape of the widget/palette. Each button or clickable item can be colored a unique color. Continuous items such as sliders can have a color gradient.

Figure 1:
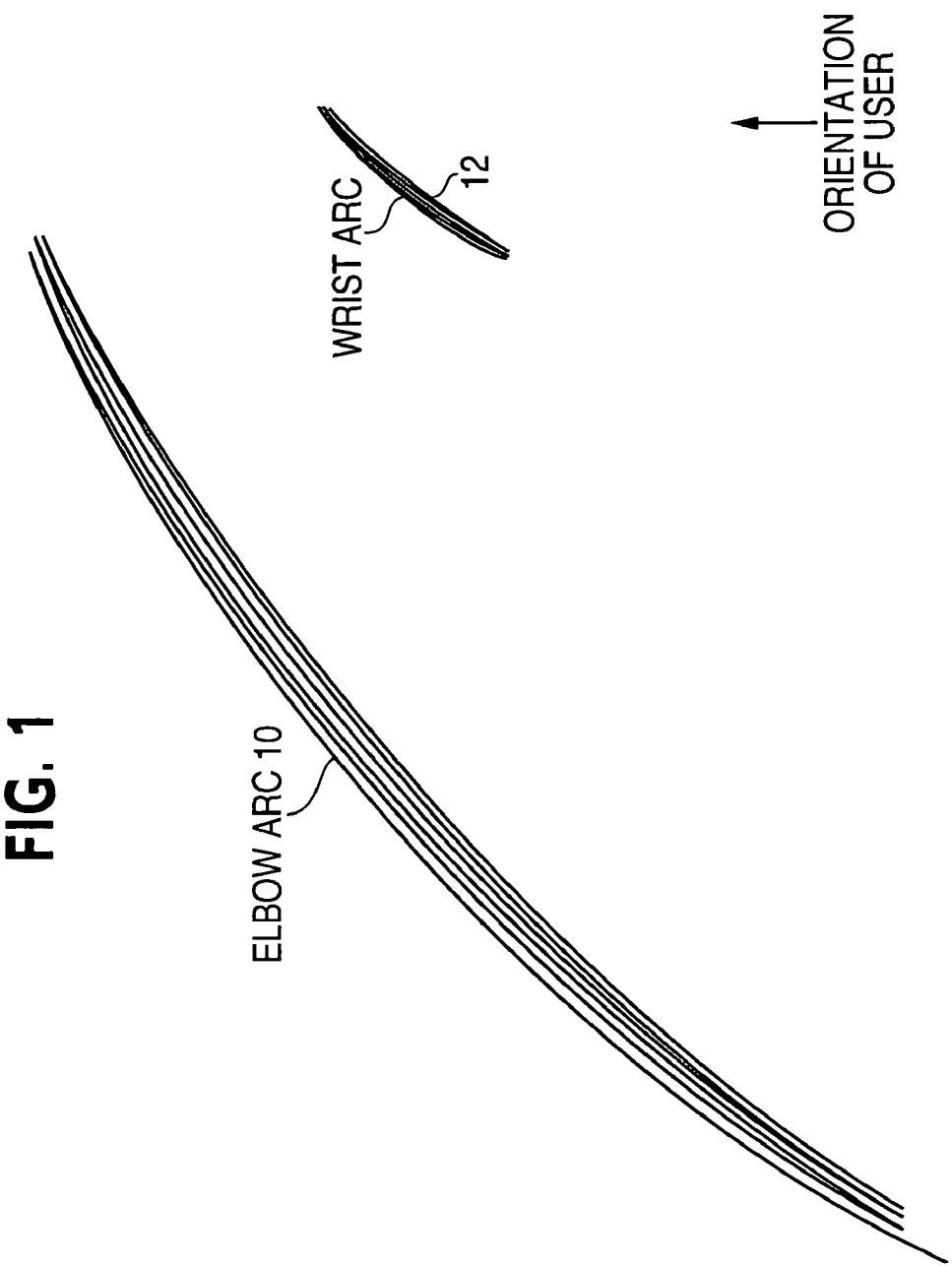
FIG. 1 illustrates right-hand elbow and wrist arcs made by moving a person hand.
Figure 2:
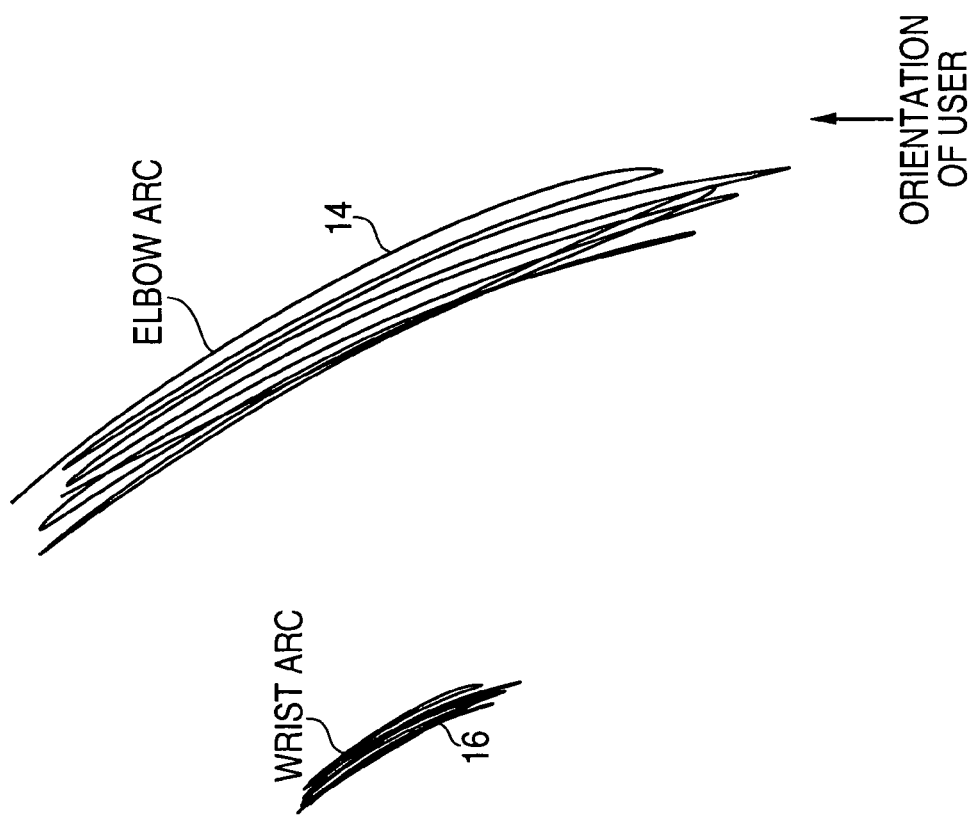
FIG. 2 depicts the elbow and wrist arc for a left-handed user.

The interface elements of the present invention can include or be oriented along a specific "idealized" or generalized element arc (or curve) shape (in degrees) for the user to target when interacting with the interface, although a custom user specific arc can be used. This element arc is based on the arc 10 of the movement of the hand, as depicted in FIG. 1, when the arm is pivoted at the elbow and/or on the arc 12 of the hand when the hand is pivoted at the wrist. The element arc can also be based on the arc of the shoulder and the arc of the fingers, as will be discussed later herein. This element arc can generally depend on the characteristics of each user as shoulder, arm, hand, finger lengths, etc. are somewhat different from person to person. The element arc varies slightly between the large gestures for an arm pivoting at the elbow and/or shoulder and a hand pivoting at the wrist. The arc also may vary depending on what device is being used (e.g., a PocketPC, TabletPC, etc. or an electronic whiteboard). Different orientations for the arcs 14 and 16 are typically defined for right-handed user (FIG. 1) and left-handed users (FIG. 2). An idealized arc can be determined by having a cross section of users draw arcs on a display, having a processor sample the drawn arcs, conventionally fit arc curves to the drawings, and then select an idealized element arc by one of a number of approaches. The arcs or radii of the cross section of users can be averaged to obtain the idealized element arc. Alternatively, the arc radii can be fit to a normal, standard deviation or other type distribution and the idealized arc determined based on the distribution. In addition, a user could define or customize a baseline arc of comfort to be used instead of the idealized element arc in a similar manner by having the user draw an arc strokes on the display, a processor sample the drawn arcs, and conventionally fit an arc curve to the drawing strokes. In such an idealized or customized element arc, the radius need not be constant and can vary along the curve to match the particular combinations of pivots or motions by the user(s). It is also possible to have different "standard" arcs for different types of devices, such as a large radius shoulder arc for a white board, a medium radius elbow and/or wrist arc for a laptop computer or a digitizing tablet and a small radius finger arc for a PDA.

Figure 3:
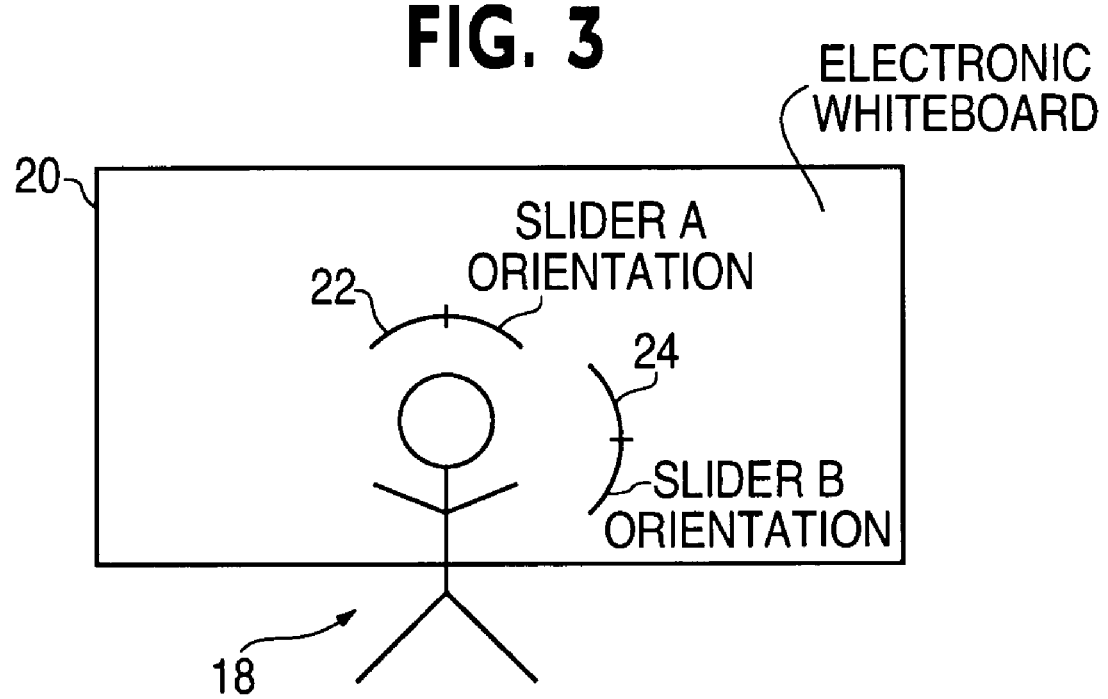
FIG. 3 depicts arcs for a standing user.

The present invention also recognizes that widgets can be oriented differently depending on the operating position of the widget relative to the user. For example, a user 18 is working at an electronic whiteboard 20 (see FIG. 3) and the user is controlling a slider; the slider can be popped-up directly in front of the user working at the electronic whiteboard, e.g., in front of their chin. In this situation, an arc shape slider 22 can reflect roughly a downward arc, like a frown on a smile-face. However, if the user popped-up the slider a significant distance to their right, a slider 24 can be oriented sideways, like a right handed, close-parentheses ")".

The present invention also provides for the most frequently used commands to be positioned along the main "dominant" arc or curve pathway. So, for example, the Alias Sketch-Book™ application, for right-handed users, has it's main command toolbox located at the bottom left of the screen (the base of the dominant arc) where the hand moves from the command base to the main canvas region as discussed in the related application.

Pop-up widgets, such as menus, can also conform to the arc shaped layout as discussed later herein.

Figure 4:
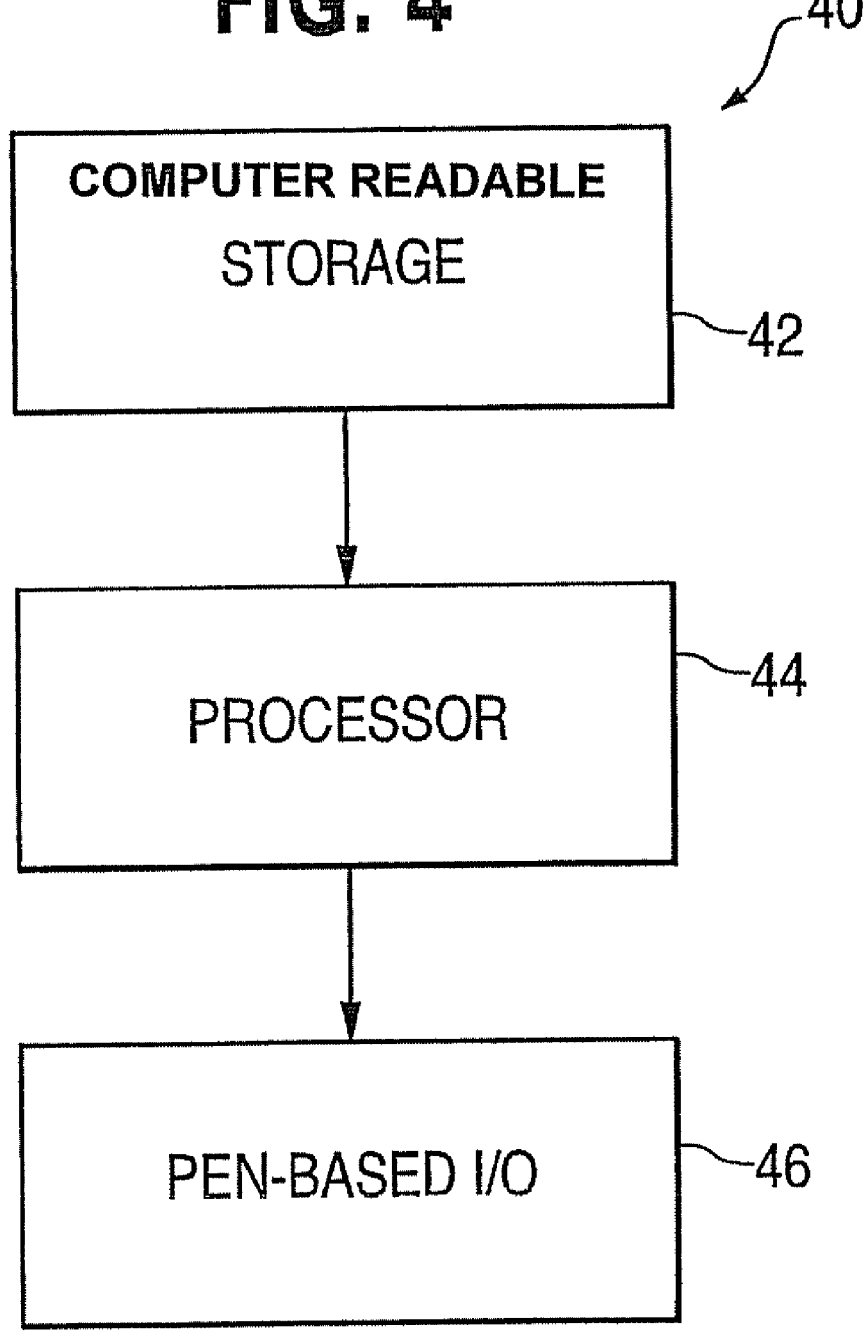
FIG. 4 depicts hard ware of the present invention.

The present invention preferably uses a hardware platform 40 as depicted in FIG. 4. This platform 40 includes a conventional computer readable storage 42 (RAM, ROM, hard disc, floppy disc, CD, DVD, etc.) for storing layer editors, paint programs, data structures, data, curve fitting functions, etc. used by the present invention as well as the processes, bitmap graphics and bitmap hit zones of the invention discussed herein. The plafform 40 also includes a conventional processor 44, typically a tablet personal computer (Tablet PC) class machine. The platform 40 further includes a conventional pen based I/O system 46, such as a display with a pen-based digitizer, and optionally includes conventional I/O components, such as a keyboard floppy disc, mouse, etc. The I/O system 48 can also be the type that allows touch input by a finger and input by a 3D position sensing system that senses the 3D position of a finger, hand, eyes, etc. as well as via a mouse or other conventional input system.

Figure 5:
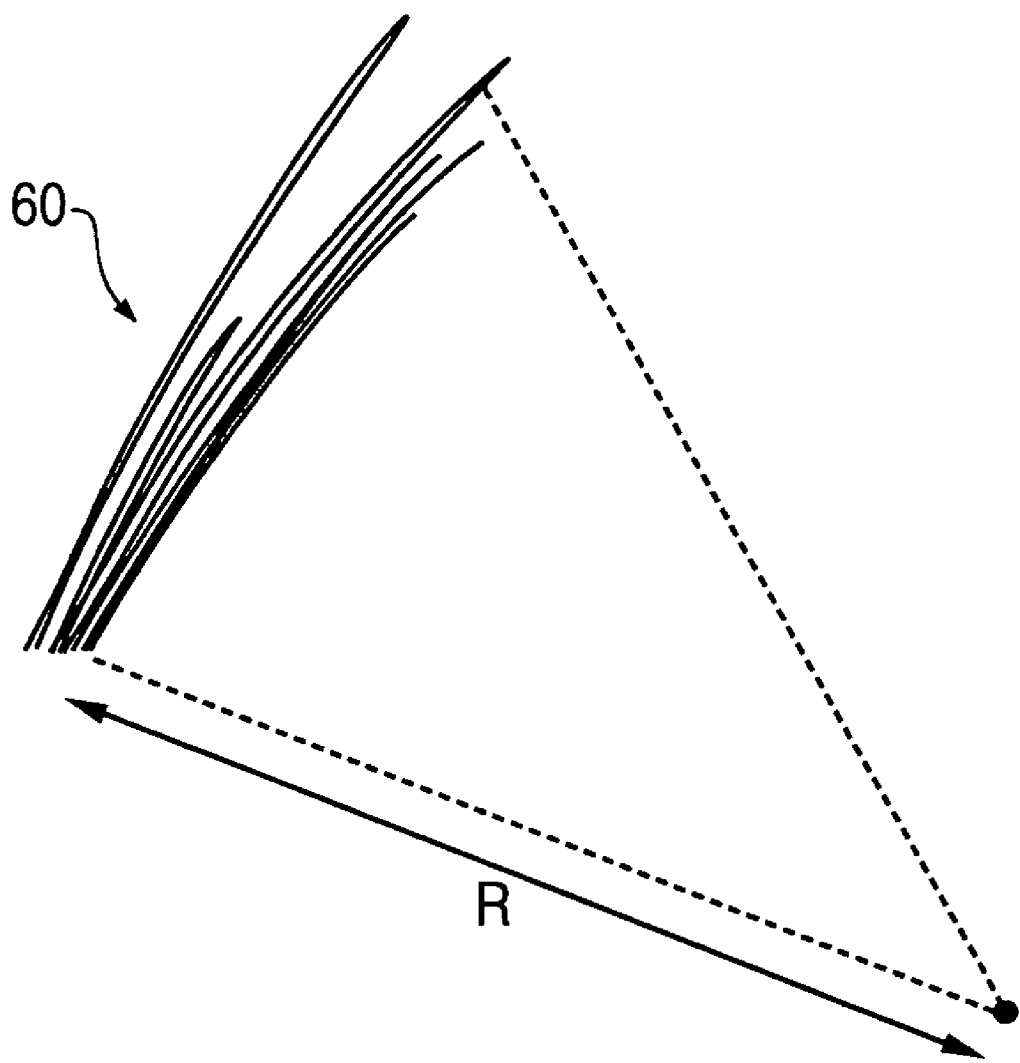
FIG. 5 shows elbow arc drawing strokes.

In designing an arc shaped or oriented element, the user(s) is allowed to make pen strokes 60 on a pen-based computer display using a conventional drawing tool as depicted in FIG. 5. This results in naturally shaped, neutral posture (no motion of fingers or wrist), arc shaped strokes due to the arm pivoting at the elbow (and possibly with some added curve influence of the hand pivoting at the wrist). The strokes are sampled and a curve is fit to these strokes in a conventional manner. These stroke arcs have a radius R that generally defines the curve of the arc.

Figure 6:
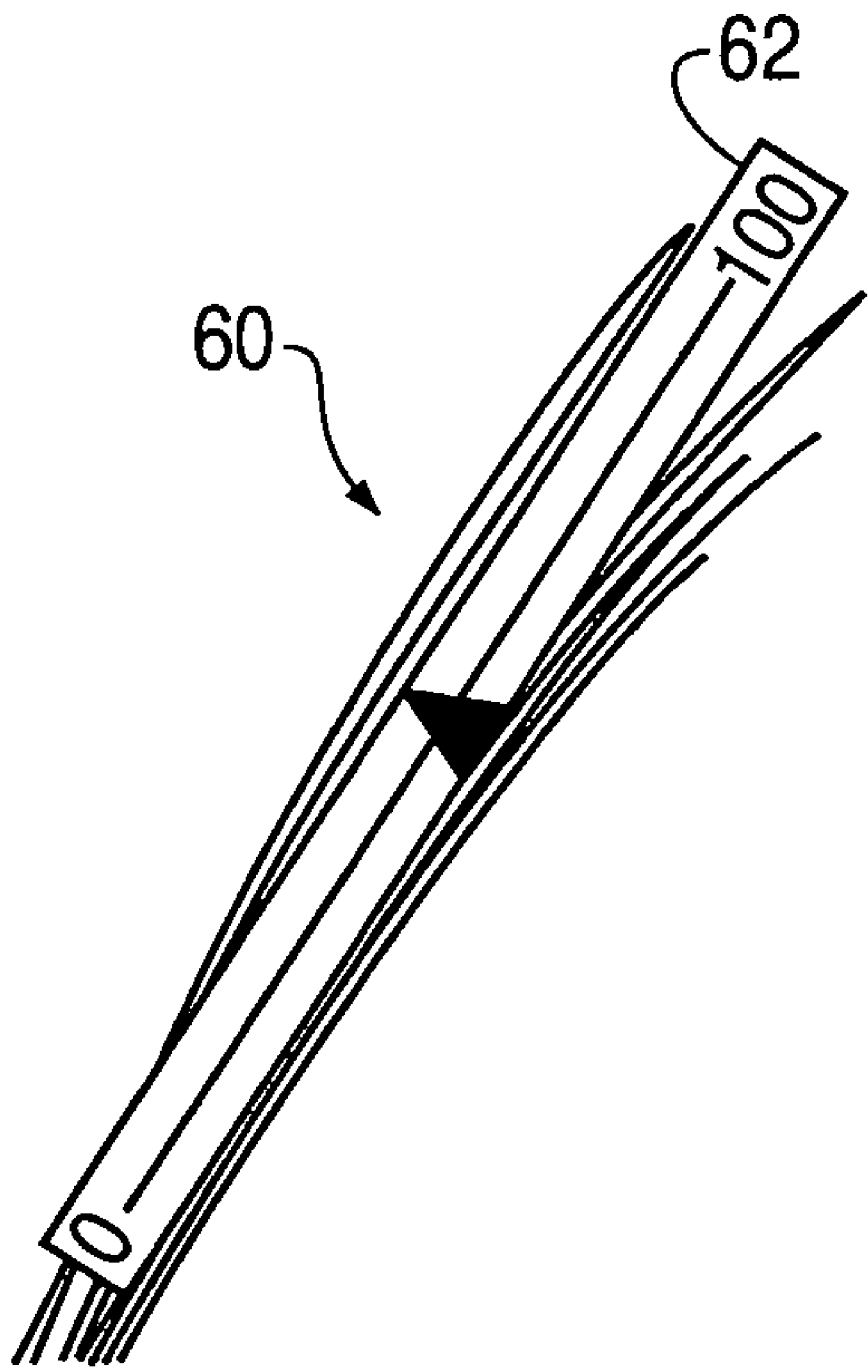
FIG. 6 depicts a linear interface element oriented to a stoke arc.

A linear interface element, such as a slider 62, can be oriented essentially tangent to the arc shaped strokes 62 (or the fit curve) at a point along the strokes, such as a mid point, as depicted in FIG. 6. Note the text "100" at the top end of the interface can be rectilinear aligned with the display or curved. Such an arc oriented interface element 62 is easier to use than the typically vertically or horizontally oriented interface element as the user can move along the element 62 more easily with a more to natural simple type, non-compound motion.

Figure 7:
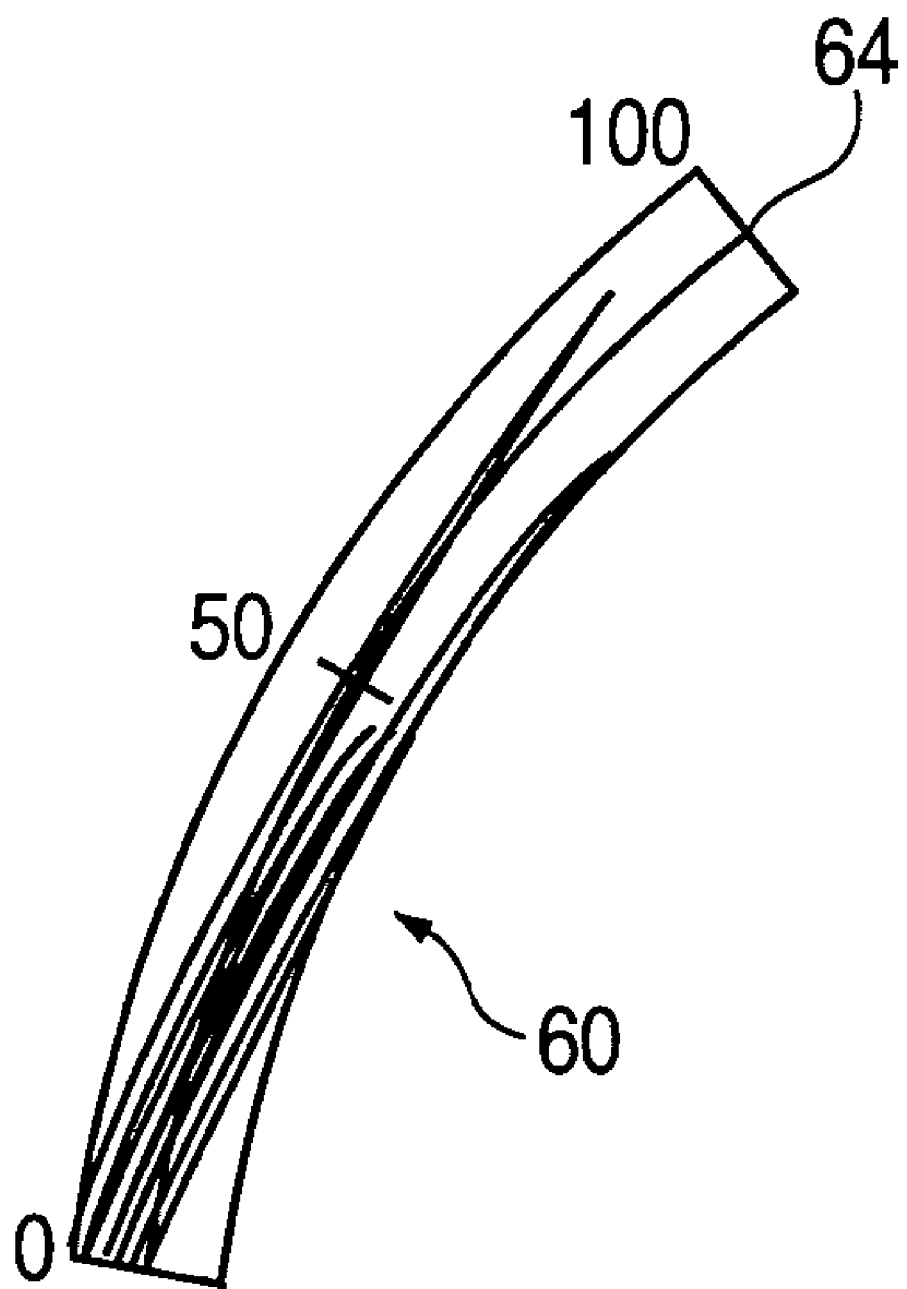
FIG. 7 shows an arc shaped interface oriented to the stroke arc.

An interface element, such as slider 64, can also be bent or arced to follow the arc shaped strokes 62 as depicted in FIG. 7. This curved slider 64 conforms to the element arc discussed above, and is much easier and more natural to use than the typical rectilinear interface elements. This curved slider 64 can be created by conventionally mapping the pixels of the bitmap of a conventional slider to a bitmap curve or vector graphic curve for the curved element corresponding to the arc. For example, a bit, pixel or graphic element at a particular length distance from a reference end of the conventional slider along a centerline of the conventional slider and at a width distance from the center line on one side of the centerline of the conventional slider are mapped to the corresponding position relative to the arc curve in the arc shaped slider 64. This mapping is performed for all of the graphic elements of the slider. A corresponding mapping occurs for the hit zone. The interaction behavior of the standard slider maps to the new arc shape space and orientation. Even invisible elements such as an out-of-range border for the standard slider maps to an arc shaped out-of-range border for the arc-based slider.

Figure 8:
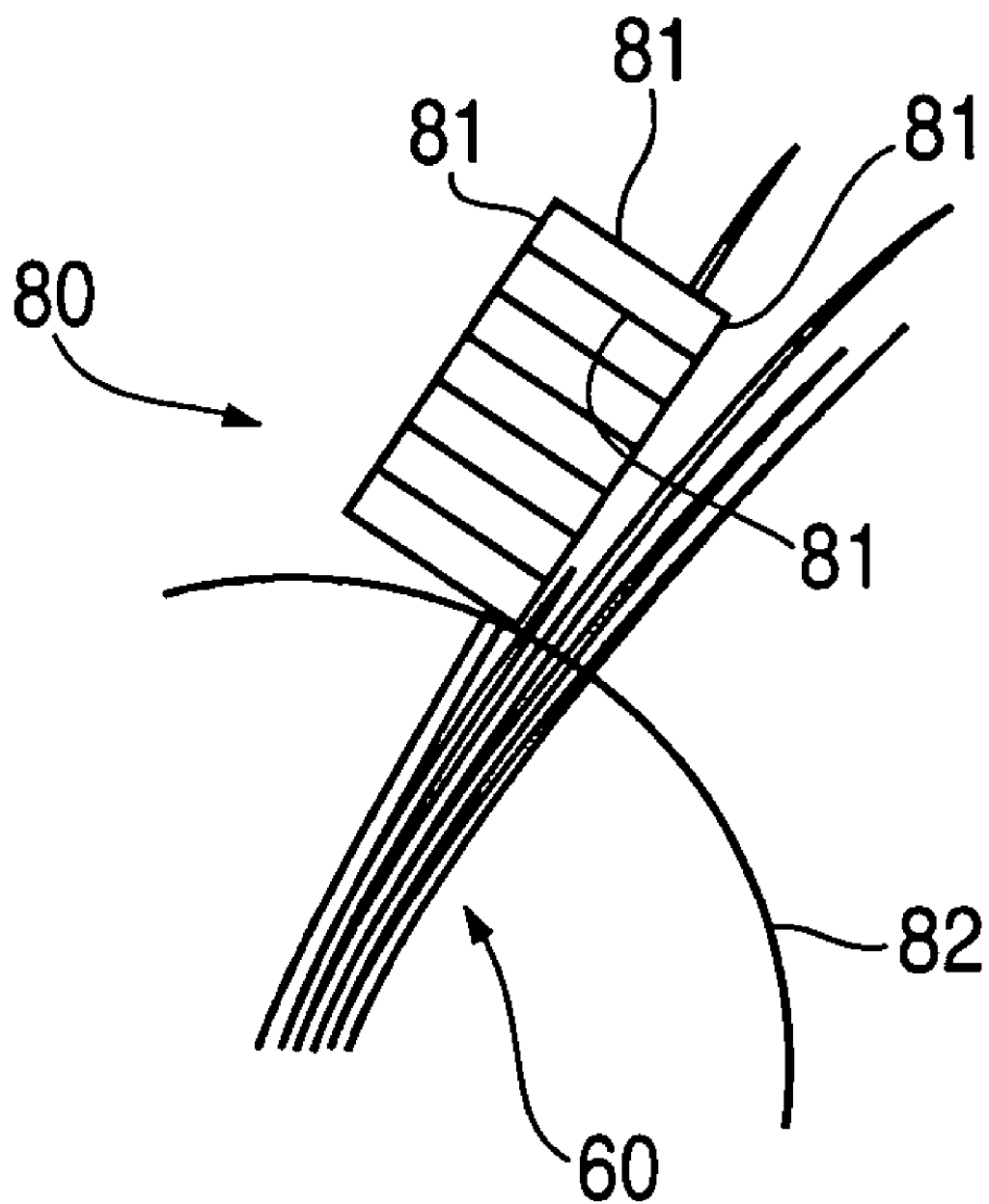
FIG. 8 shows a multiple control interface oriented to a stroke arc.
Figure 9:
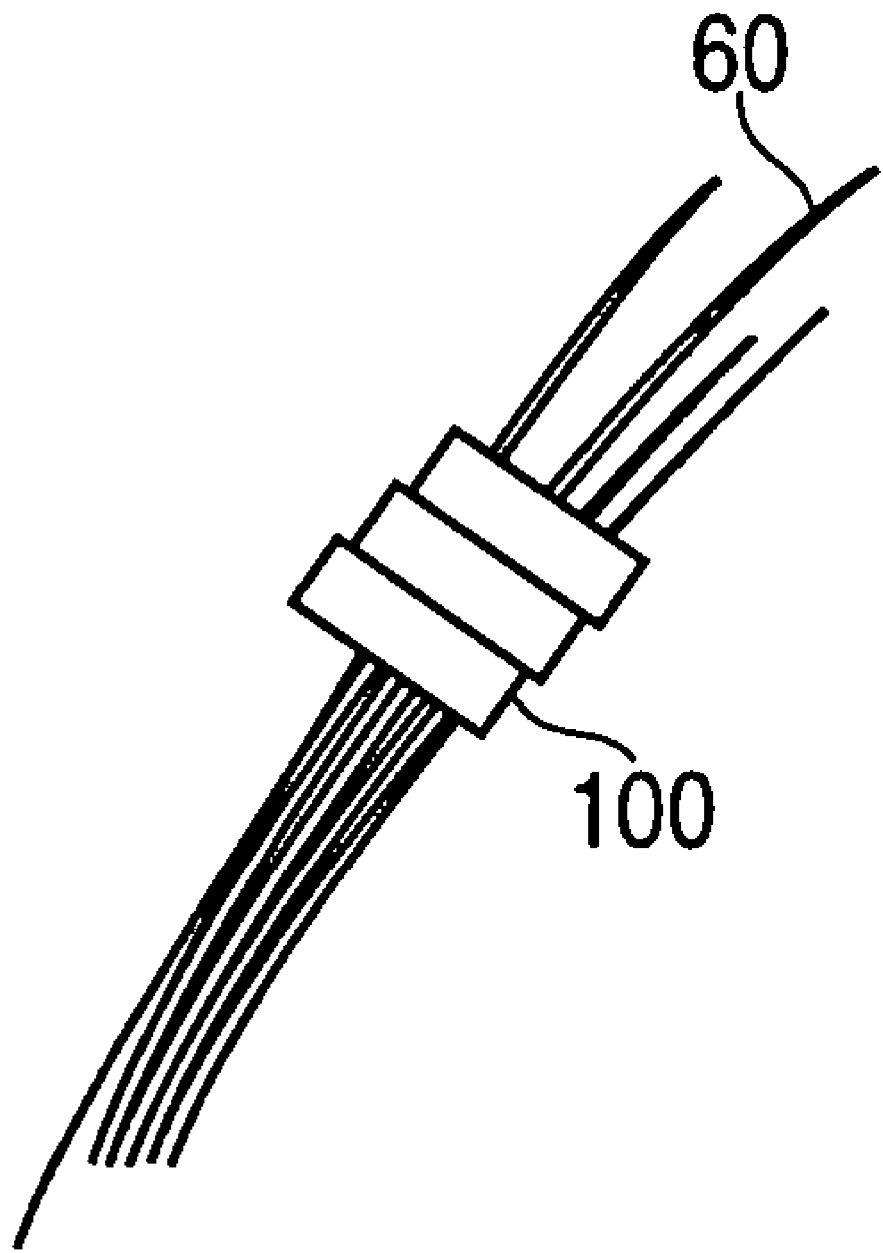
FIG. 9 shows multiple control elements staggered along an arc stroke.
Figure 10:
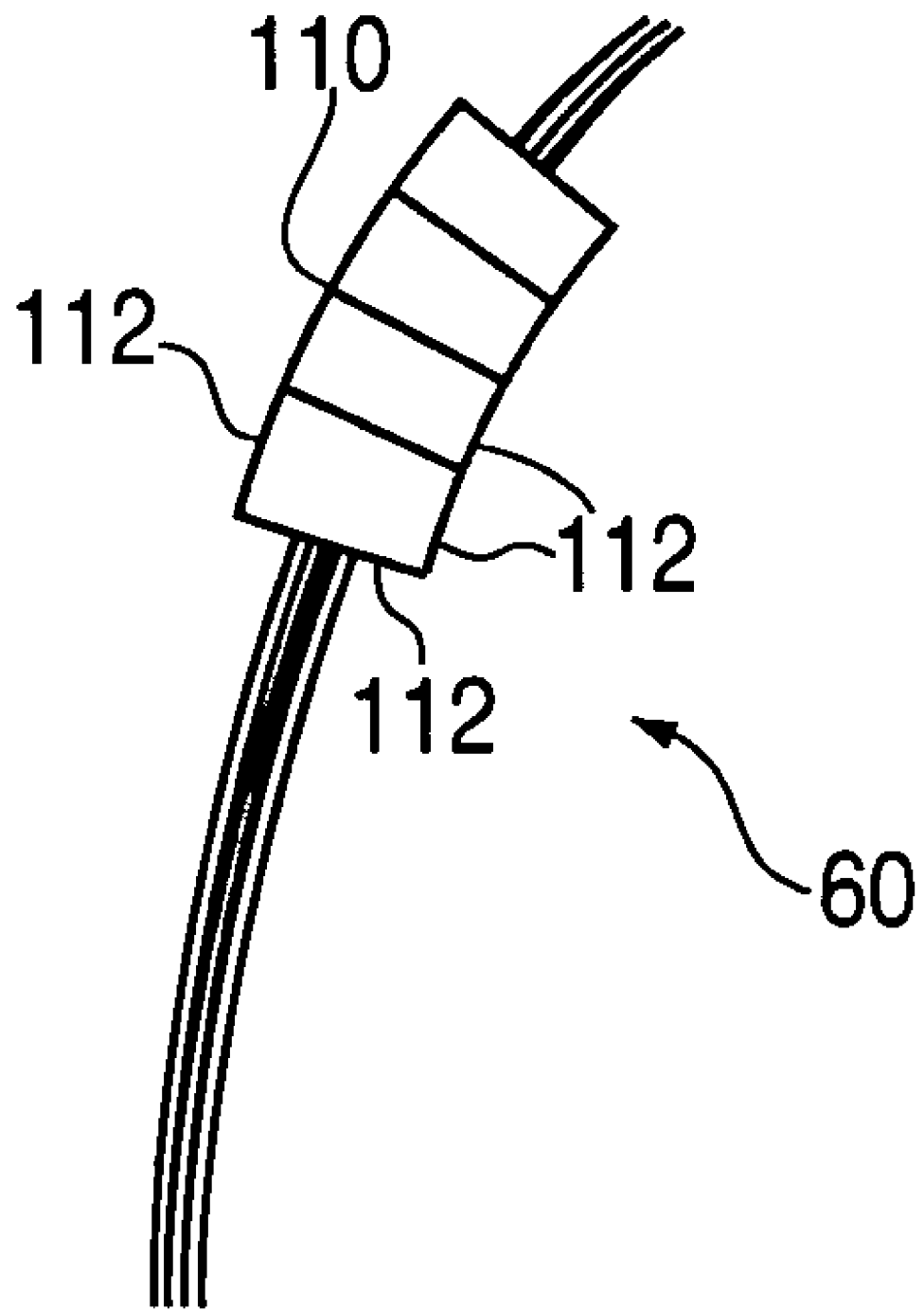
FIG. 10 shows arc shaped multiple controls.
Figure 11B:
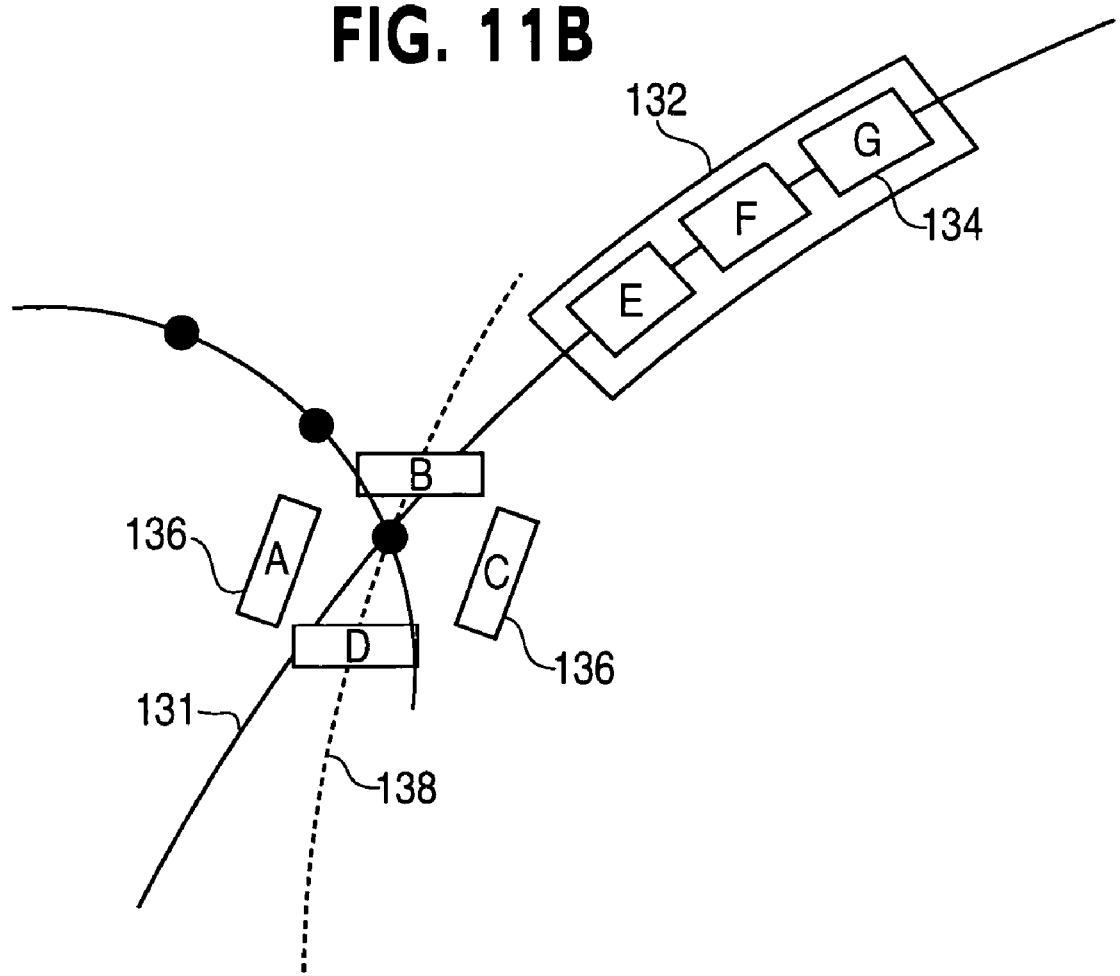

A multiple control interface element, such as a menu 80, can also be oriented to the arc shaped strokes 60 and maintain it's rectilinear shape, as depicted in FIG. 8. That is, the sides 81 of the controls are linear. In this case the menu 80 is also aligned with a curve 82 that is perpendicular to the strokes 60. This curve 82 is called an anti-arc, anti-curve or counter-arc, and is a curve that is oriented 90° from the elbow dominant arc of the strokes 60. This arc allows selection of items along this arc by slightly changing the shape of the dominant arc with a slight added motion added by the wrist and/or fingers, that causes the dominant arc to be extended above or below its natural path. Such a multiple control menu 100 can also have the rectilinear controls staggered along the arc shaped strokes 62 as depicted in FIG. 9. And a multiple control menu 110 can itself be arc shaped as depicted in FIG. 10, such that the controls are non-rectilinear and conform to the arc shaped strokes 62. That is, the sides 112 of each of the controls is arc shaped Pop-up toolbars 120 can also adopt the orientation of the arc as depicted in FIG. 11A. Note how the marking menu icon remains horizontally orientated for easy reading while the individual finger arc tool targets (hot spots) 122-128 adhere to the anti-arc extended arc orientation. This figure also shows the concept of a marking menu 126 as one of the tools, with visible commands in this case, and that has an "overflow" area 130 that, in this example, is up and to the right of the marking menu center along the dominant elbow type curve. As can be seen, the positioning of the overflow area 130 can also conform to the underlying arc paradigm. The shape of the overflow area 130 can take on the similar arc contour shaped palette depicted previously in FIG. 9 and 10. FIG. 11B illustrates the pop-up menu with an elbow arc 131 shaped overflow area 132 with arc shaped controls 134 therein. This embodiment also shows the marking menu regions 136 oriented and aligned along a wrist shaped arc 138.

The targets or hit zones of the controls (as well as the graphics thereof) can be curved as more particularly illustrated by the wedge shapes targets 140-146 of FIG. 12. This figure also shows a marking menu 148 with visible commands popping-up as a result of the activation of the control for zone 142.

Figure 13:
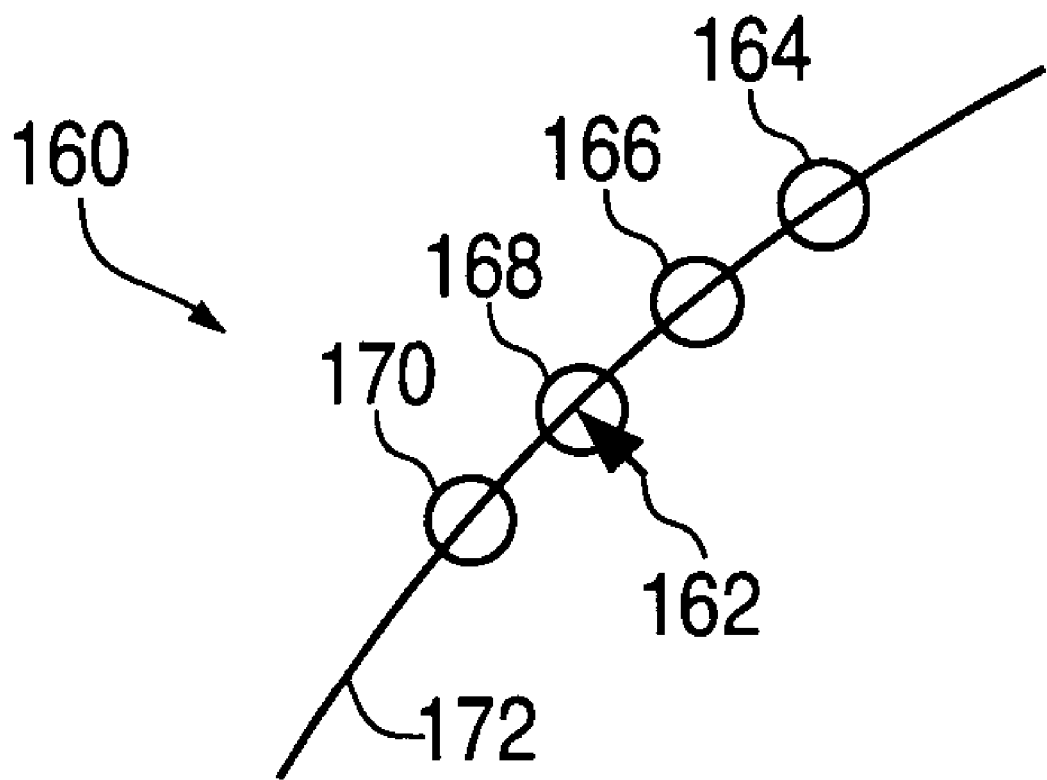
FIG. 13 shows arranging interface elements along an arc with the most often used element under the cursor.

FIG. 13 depicts a pop-up menu 160 positioned at the location of the cursor 162 and with the selectable items 164-170 oriented along the biomechanical element arc 172. In this case, the pop-up 160 has four items 164-170 represented graphically as circles intersecting the arc 172. The pop-up 160 remains fixed until the mouse-up event occurs. On initial pop-up, the default item 168 is conventionally presented directly under the current position of the cursor 162. The user can move up or down the arc 172 to select the different items 164-170.

Figure 14:
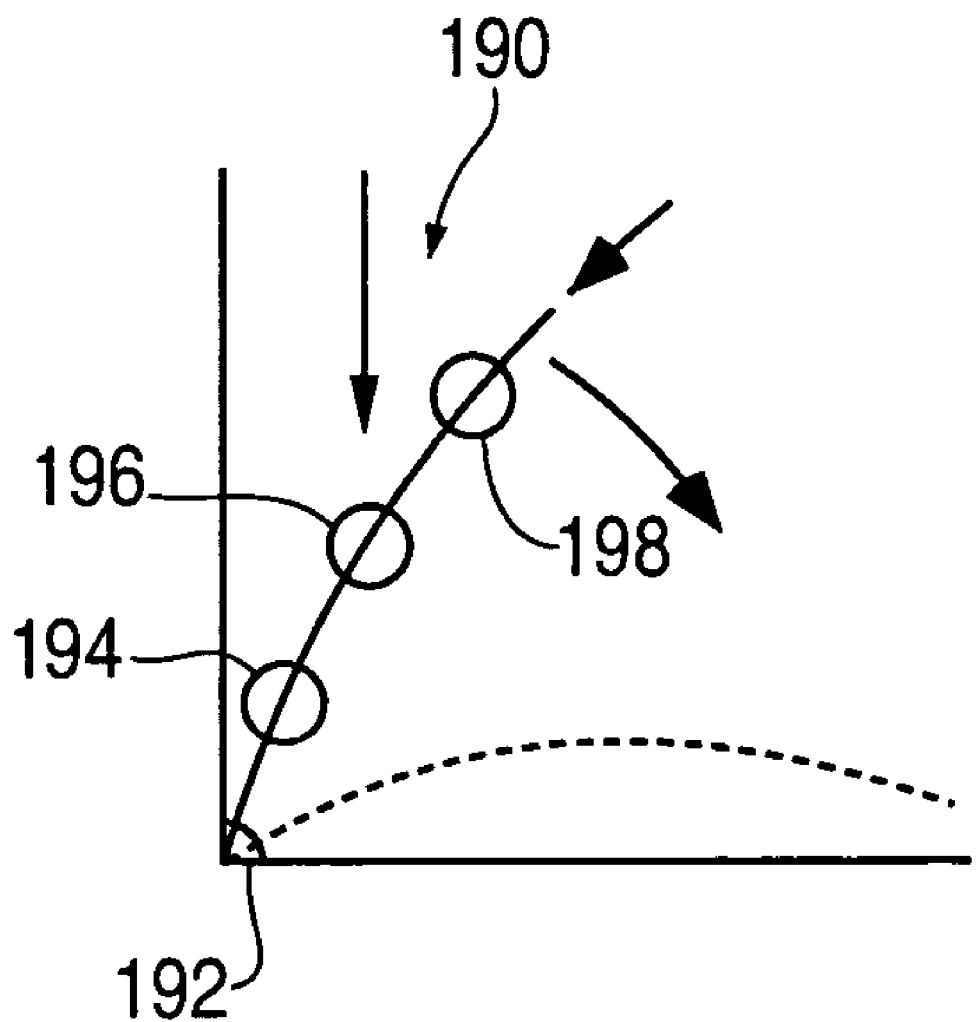
FIG. 14 shows an arc shaped interface that can be reoriented.

In FIG. 14 an arc-shaped command strip 190 is defined. The strip 190 is anchored at a base 192 and contains user interface elements 194-198. In this case, each element contains an icon and a marking menu. Alternatively, other widgets and status information can be housed on, within or near the command strip. The command strip 190 can be manually re-oriented (twisted or bent) and the elements follow the new orientation. The command strip can behave like real-world materials and have the same dynamic properties (e.g., a metal strip with a given flexibility and stiffness where each item is a ball with a given physical weight). The user can manipulate the command strip 190 to enlarge or shrink it or to move it out of the way. For example, the strip 190 can be bent downwards, upwards, pulled-out (to expose more elements on the command strip, to expand individual targets on the strip, or to increase spacing between items on the strip). Conventional move, expansion, etc. techniques are used to re-orient, the strip 190.

Figure 15:
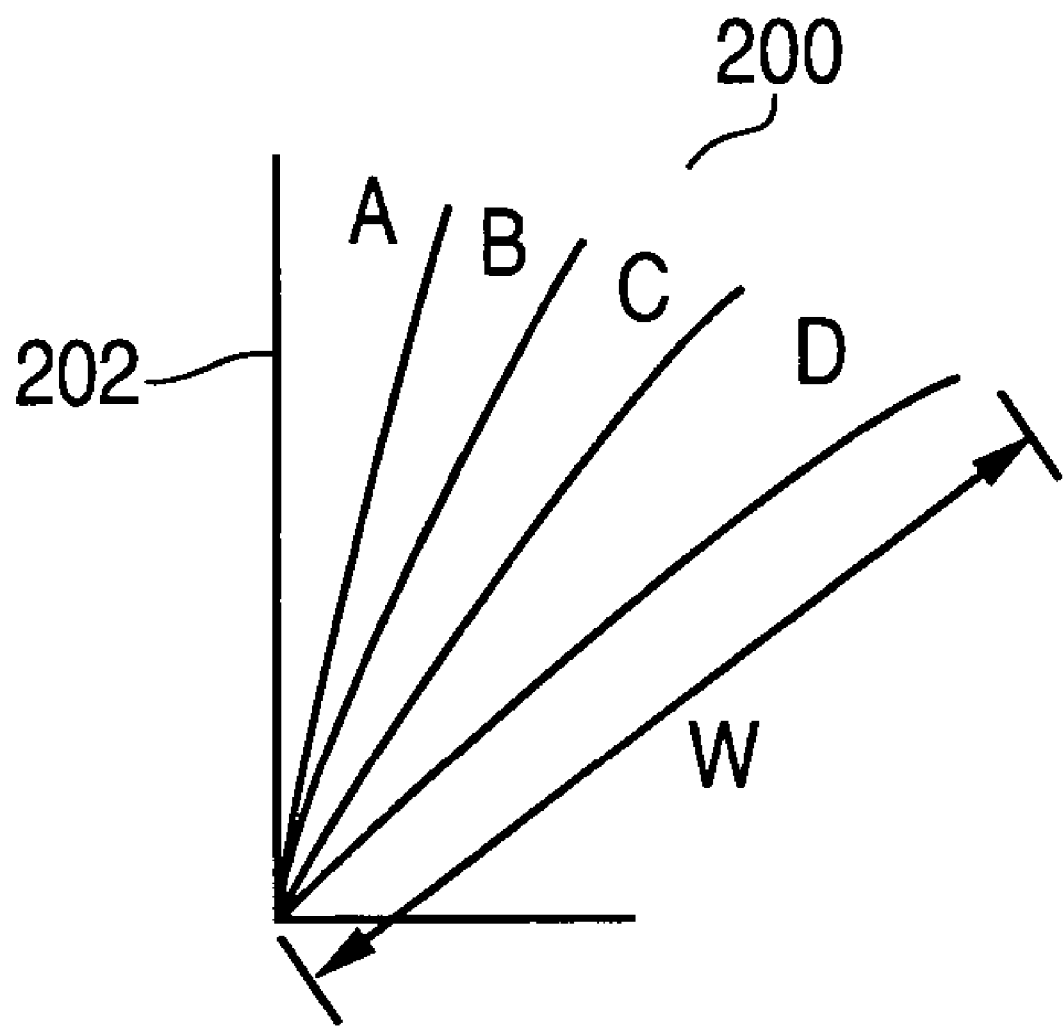
FIG. 15 shows arc shaped corner targets.

FIG. 15 depicts another arc based interface embodiment 200. In this figure the bottom left corner region of the screen 202 houses a number of "targets" A-D roughly in the shape of triangles with arc shaped sides. Each of the regions A-D houses a different command that in this case is a different marking menu. The "blades of grass" each having a length or width W delineate the different hit zones. This interface allows for extremely wide targets when the user is starting roughly from the center of the display screen and is moving the cursor to the bottom left corner of the screen. It is known that wide targets allow for fast selection performance. Note that the bottom right corner with the blades of grass pointing towards the center could be used if the user were left-handed.

FIG. 16 is an example of a marking menu overflow region 210 positioned up and to the right of a circular menu region 212 (see the related application). In this example, the overflow region houses a variety of paint brushes, pencils and erasers. The shape of the palette 210 and the layout of the individual items are arranged roughly to match the biomechanical arc. This figure also shows the interface 212 positioned at a location accessible by a user when making a natural elbow pivot to swing a hand across a display toward the lower right corner.

Figure 17:
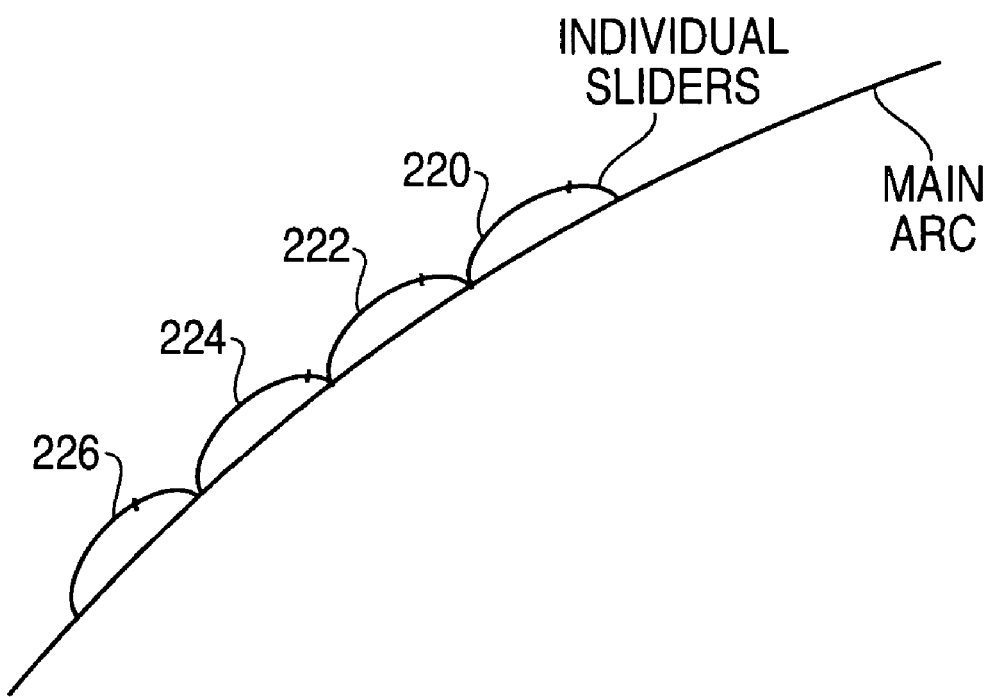
FIG. 17 shows elements along an elbow arc and interface element wrist arc shaped.

FIG. 17 is an example of an interface with a mixture of elbow and wrist orientation. Here we see a collection of sliders 220-226 oriented along a main or elbow arc 228 and each slider is oriented or shaped to match the wrist shape arc. This allows the user to select a slider by elbow pivoting and then control the slider by wrist rotation.

Figure 18:
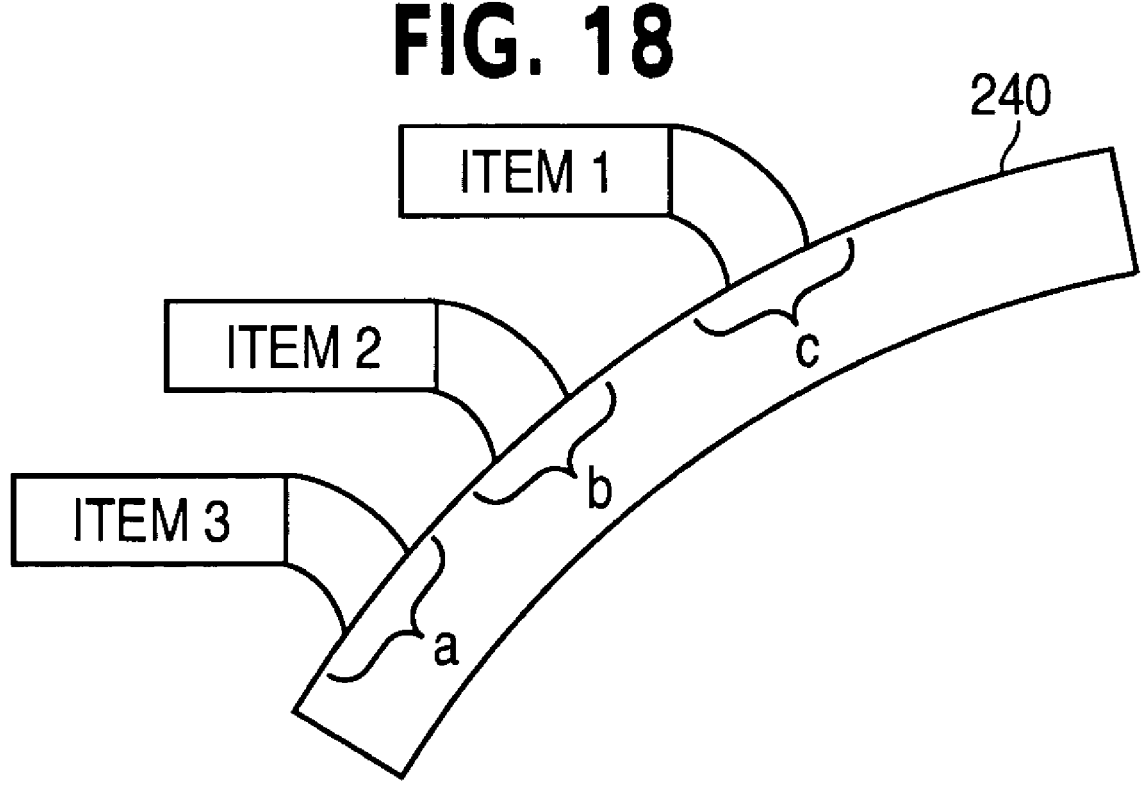
FIGS. 18 and 19 show elements along an arc with different depths and widths.
Figure 19:
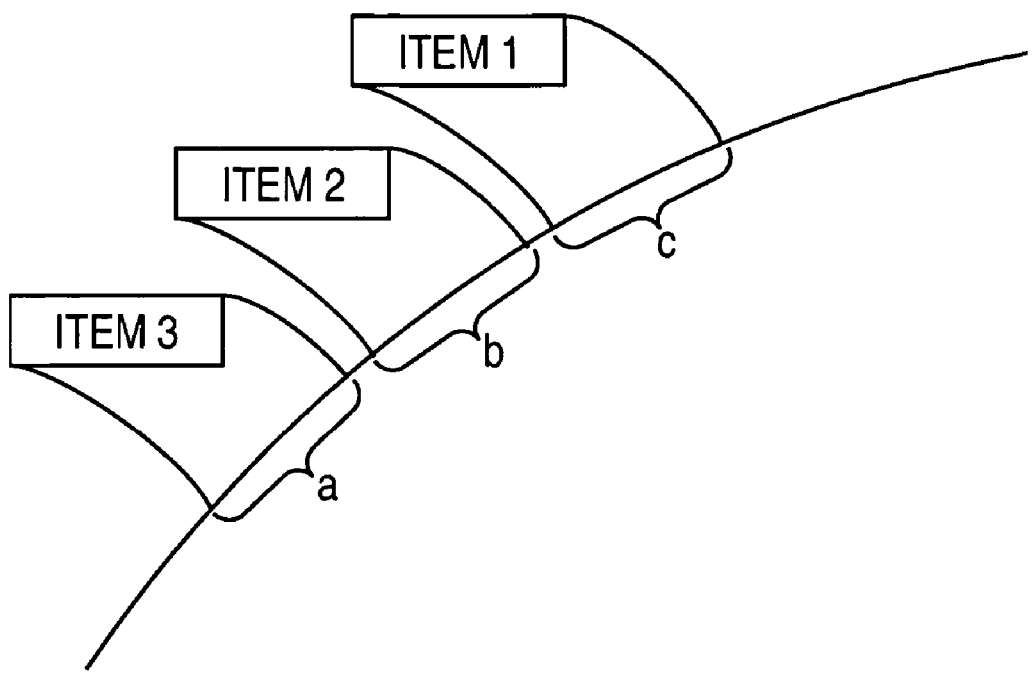

In FIG. 18 control items 1-3 are arranged along an elbow type arc 240 where each item has a narrow but deep hit zone (a-c). The hit zone for each item also includes a region within the dominant arc widget. FIG. 19 depicts a similar layout with wider hit zones (a-c) for the items 1-3.

Figure 20:
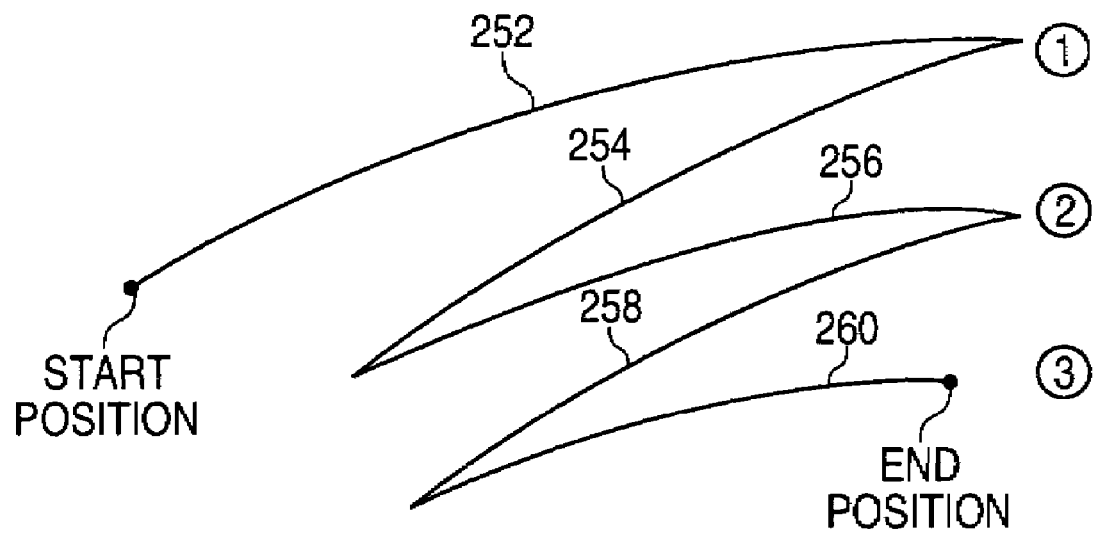
FIG. 20 shows multiple arc selection.

FIG. 20 shows a sequence of arc motions 250-260 that can be used to set different parameter attributes. Alternatively, it can increment values (in this case, 3 increments are specified)

Figure 21:
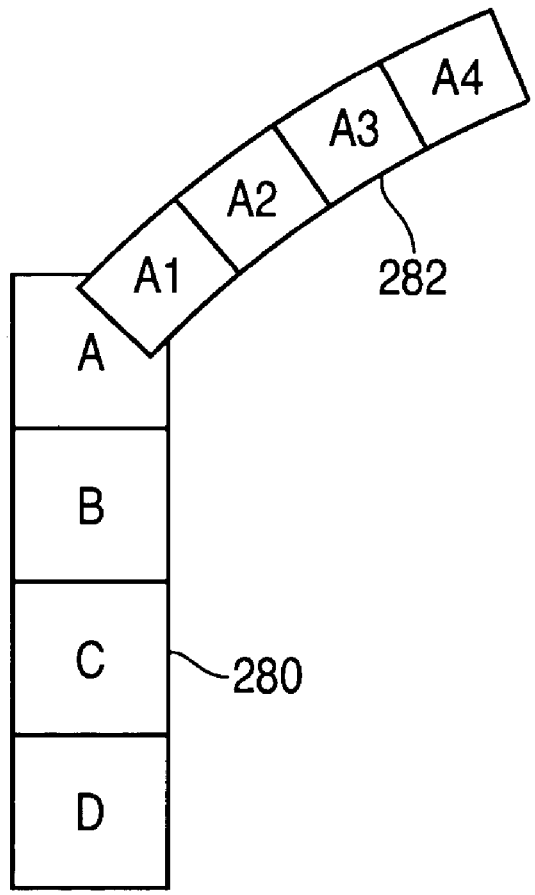
FIGS. 21 and 22 show combinations of rectilinear menus with arc shaped menus.
Figure 22:
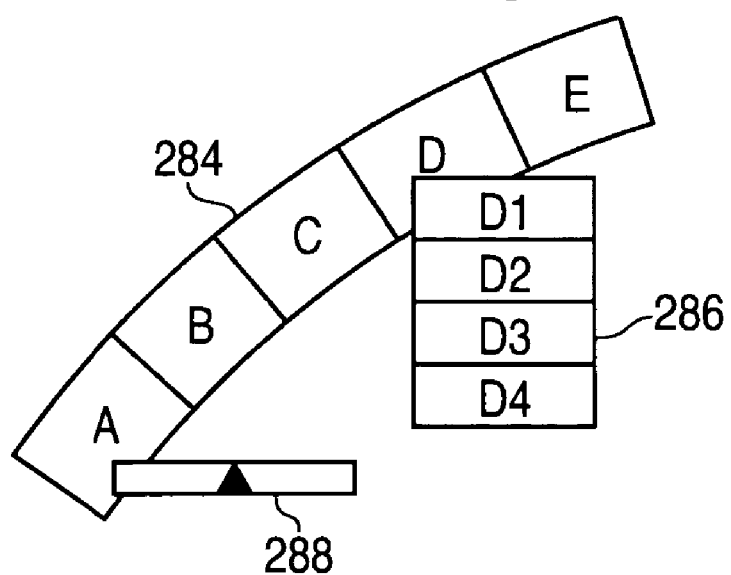

FIGS. 21 and 22 illustrate combinations or rectilinear and arc shaped interface elements. A rectilinear menu 280 with an arc shaped sub-menu 282 is shown in FIG. 21 while an arc shaped menu 284 with rectilinear sub-menus 286 and 288 is shown in FIG. 22.

Figure 23:
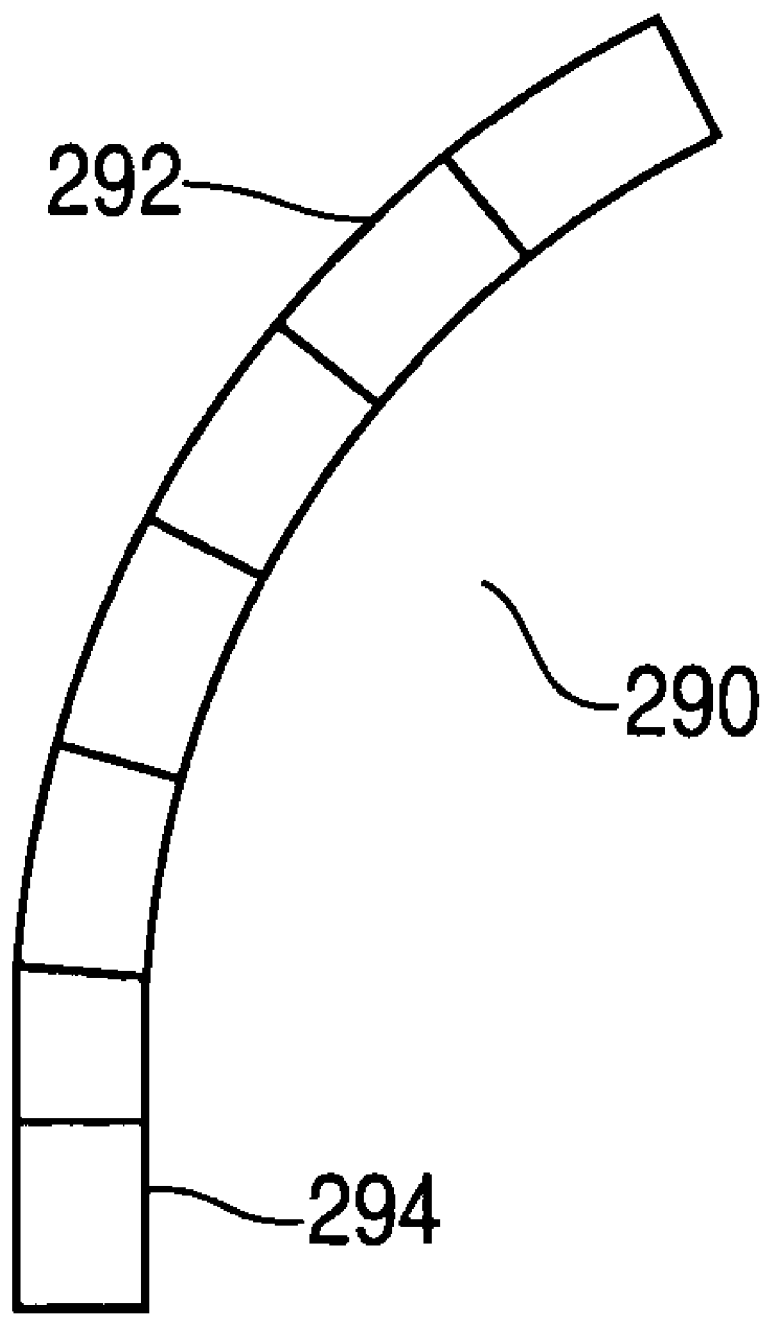
FIG. 23 shows a menus with an arc shaped portion and a linear portion.

FIG. 23 shows a hybrid menu 290 with an arc shaped portion 292 and a rectilinear portion 294 allowing a combination of easy to access elements and elements that are harder to access such as for functions with less used consequences, such as a delete function.

Figure 24:
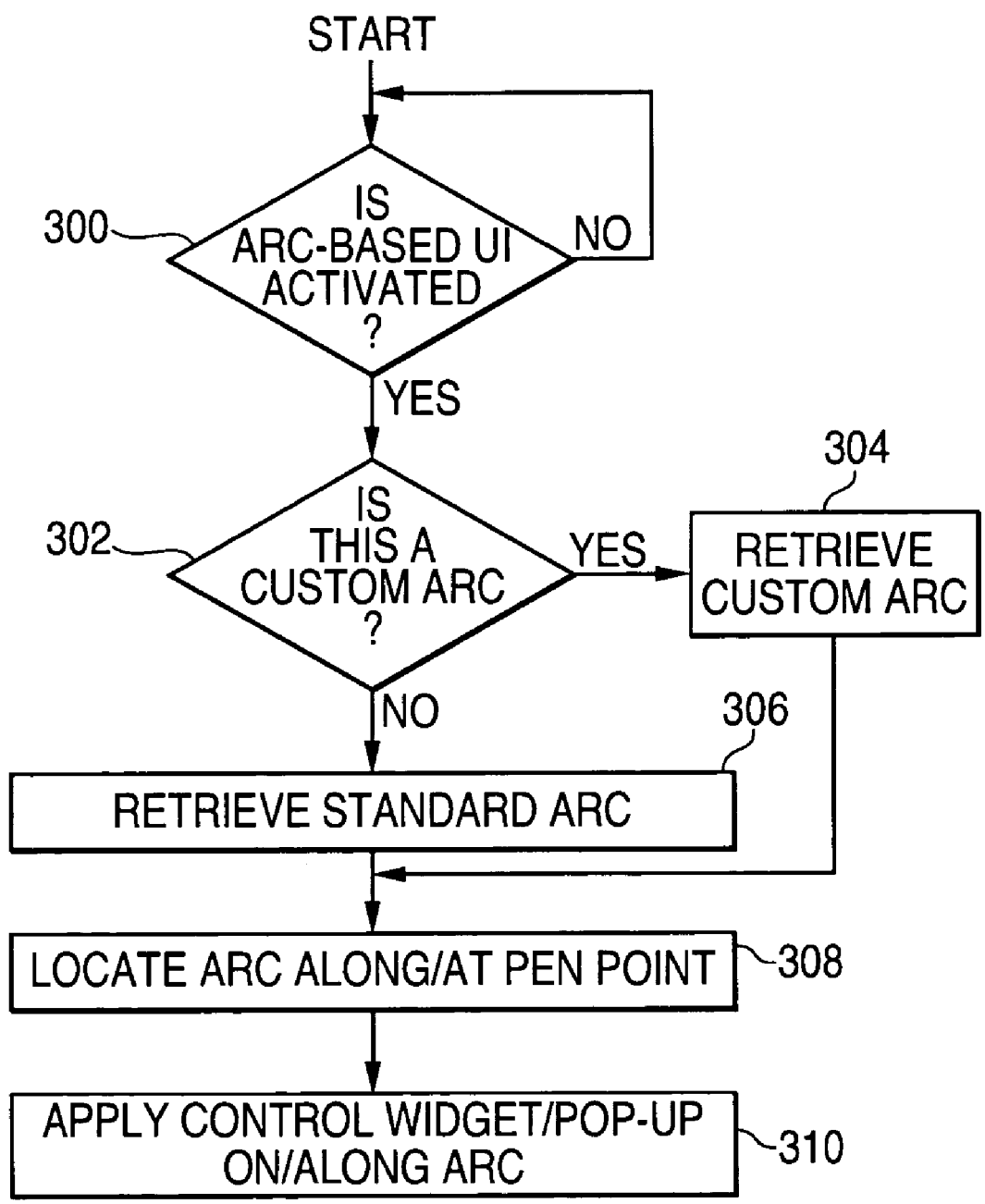
FIG. 24 depicts the operations of the present invention.

The operations of the processor in producing pop-up arc shaped or oriented interface (GUI) elements of the present invention are shown in FIG. 24. When the pen-based I/O system hardware detects an activation signal, such as a tap or pen down, the location of the cursor is determined and a determination 300 is conventionally made as to whether an arc based interface element has been activated by comparing the position of the pen/cursor to hit zone maps in storage. If the cursor/pen is in a region where a pop-up menu can pop-up, the system determines 302 whether the user has designated that the pop-up interface be a custom interface. If so, the custom arc is retrieved 304. If not, the standard or element arc is retrieved 306. The system then positions (308) or locates the arc along, at or in association with the cursor/pen position. If the location also affects the orientation of the arc, such as in the whiteboard example previously discussed, the arc is oriented responsive to the location. Because the interface element pops up where specified by the user, the user can position the interface away from a display screen edge and at a position where it is comfortable to use. The interface or widget is then mapped or applied 310 along/on the arc by mapping the widget graphic bitmap to the arc along with a similar mapping of any control zone for the widget. The system then monitors further movement of the pen/cursor to perform operations associated with the interface.

A non-pop-up or fixed position element can also be produced in a similar manner by starting with a known position for the interface, retrieving a custom (304) or standard (306) arc and applying (310) the interface at the predetermined location. To reduce the interference with interface operation by the display edge, the fixed position arc shaped or oriented interfaces elements can be located to a preferred side of the display, such as on the left side for a right-handed user or spaced in from the display edge by the distance of a typical wrist. To additionally reduce the interference by the edge of the display, the fixed position elements preferably also "grow" towards the center of the screen and are pop-up elements.

Figure 25:
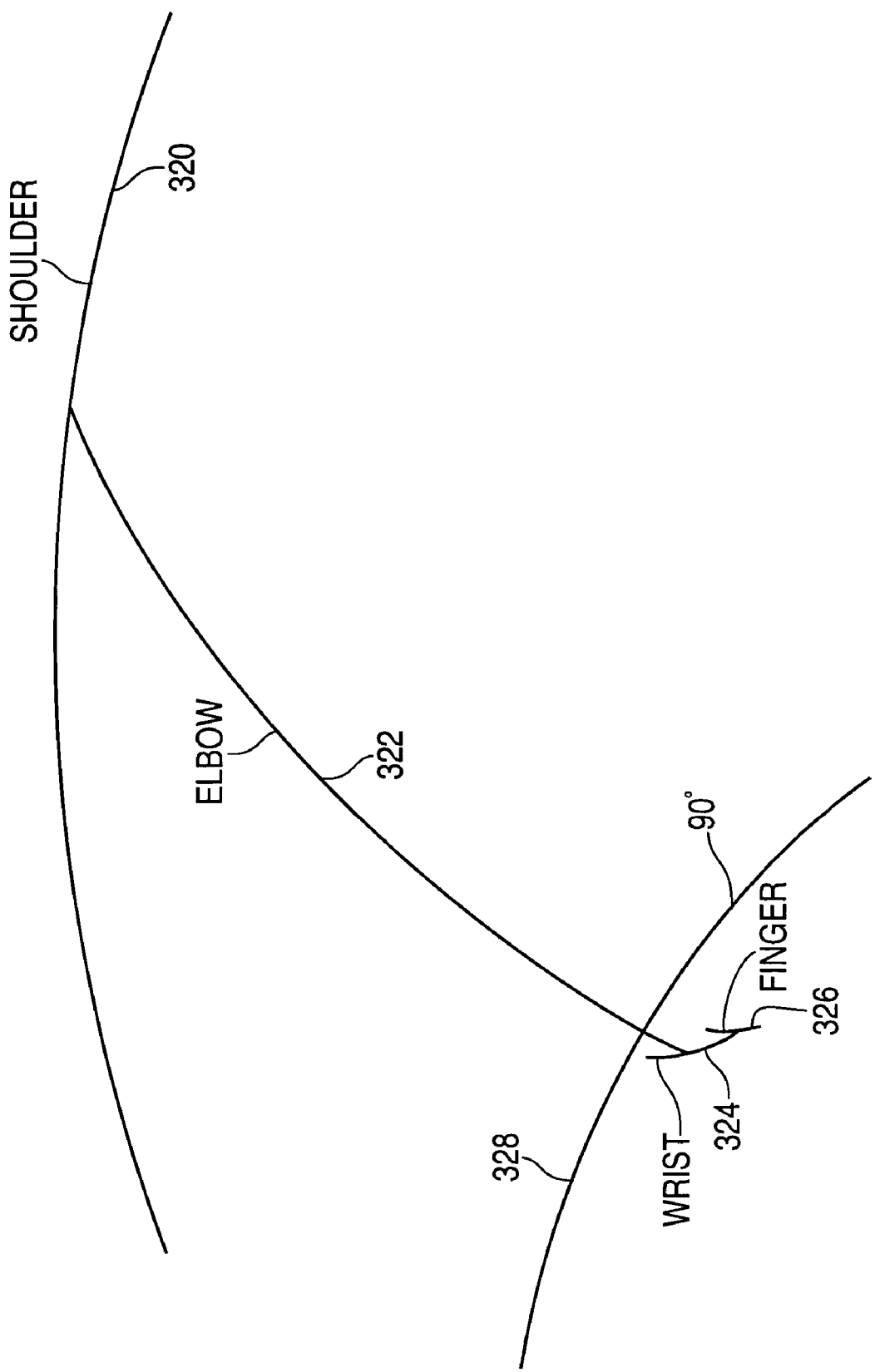
FIG. 25 shows arc that can be combined.

As previously discussed, the invention provides for the use of a combination of a number of arcs in setting a position of an interface and/or determining the shape of the interface as depicted in FIG. 17 the combination of the different arcs into a single composite arc. The elbow and wrist arcs have been primarily discussed with respect to previously presented figures, such as FIG. 1. FIG. 25 illustrates the relationships and shapes of the shoulder arc 320, the elbow arc 322, the wrist arc 324, the finger arc 326 and the anti-arc 328 or extension arc. In a three dimensional input space, other arcs can also be added to or combined with the arcs of FIG. 25 to provide a natural motion interaction in such a space. For example, an arc or curve associated with a waist twist or waist bend can be added or combined with the curves of FIG. 25.

FIG. 6 was discussed with respect to positioning the linear arc oriented interface element on a tangent to the element arc. It is also possible to position the element 340 across the arc 342 as depicted in FIG. 25. Using this approach the fingers are moved inside the arc 342 rather than outside the arc when manipulating the linear arc oriented interface element.

It should be noted that, while the examples discussed herein show a particular curved arc; the invention is not limited to this style or shape of arc. Specifically, widget or interface elements could be a design based other shapes of arcs or curves. For example, "S" shaped arcs or segmented straight lines effectively creating a curved interface element can be provided. The curve of the interface element of the invention is also not limited to paths that reflect biomechanical advantages either. For example, non-arc shapes could be used to produce a certain visual look as opposed to a particular motion.

The present invention has been described with respect to an interface useful for a tablet-stylus type personal computer. The interface and processes discussed herein are also useful in non-tablet type personal computers. The hit zone where a user can activate a control conforms to the arc of the natural motion curve has been described as coinciding with the interface graphic. However, the hit zone can be larger, smaller or a different shape than the graphic.

The present invention has been described with respect to pen-based systems but also applies to touch-screen systems and computer-vision techniques used for sensing human input, as well as systems that sense position in three dimensions of a finger, hand, etc.

The present invention has been described as conforming the approach path to a UI to a natural motion curve, conforming the shape of an overall UI graphic to the natural motion curve and as well as shaping and positioning the control elements in conformance with the natural motion curve. A natural motion curve is predominantly a smooth arc; however, a natural motion curve can include small bumps or natural variations caused by a number of different things, including a motion that uses coarse motor muscles and fine motor muscles.

The present invention has also been described with respect to positioning the controls along or on the natural motion arc or curve. However, such a positioning can, in some instances, obscure the view of the user of the control because the user's hand could cover part or all of the control. The controls can thus be positioned above or below the curve with above the curve being preferred because it is less likely to obscure the control.

The system also includes permanent or removable computer readable storage, such as magnetic and optical discs, RAM, ROM, etc. on which the process and data structures of the present invention can be stored and distributed. The processes can also be distributed via, for example, downloading over a network such as the Internet.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A display located on a single side of a user, comprising:
   an arc shaped control zone for a function of an interface located on the single side and at least a distance equal to a typical wrist away from a nearest edge of the display, the control zone forming a command strip anchored at a base and responsive to manipulation including twisting, bending, pulling, and shrinking and the control zone having elements each having a weight and behaving like real-world materials;
   an arc shaped interface element graphic located on the single side, aligned with the arc shaped control zone and indicating the function with the arc shaped interface graphic, and the arc shaped control zone aligned to a natural user motion produced by a compound motion of a rotation of the user elbow and rotation of a user wrist; and an overflow control zone formed on a counter arc intersecting the arc shaped control zone at 90 degrees.

2. A display as recited in claim 1, wherein the alignment orients the graphic and zone with the motion.

3. A display as recited in claim 1, wherein the alignment follows the natural user motion.

4. A display as recited in claim 1, wherein the alignment positions the graphic and zone at a location accessible via the natural user motion.

5. A display as recited in claim 1, wherein the natural user motion comprises a curve determined by one or more strokes of the user on the display.

6. A display as recited in claim 5, wherein the curve includes natural motion variations.

7. A display as recited in claim 5, wherein the user natural motion stroke additionally comprises a finger motion curve, a shoulder motion curve and a combination of two or more of the curves.

8. A display as recited in claim 7, wherein the curve is a curve determined by a single user.

9. A display as recited in claim 1, further comprising an interface location at which the zone and graphic are positioned.

10. A display as recited in claim 9, wherein the interface location is specified by a cursor positioned by the user.

11. A graphical user interface, comprising:
a cursor positioned on a display by a user at a location;
a function control positioned on the display responsive to the location of the cursor, located on a single side of a user and at least a distance equal to a typical wrist away from a nearest edge of the display, having an arc shaped interface graphic indicating a function of the control and having an arc shape conforming to a motion arc of a hand caused by a compound motion of an arm about an elbow of the user and the hand about a wrist of the user, the function control forming a command strip anchored at a base and responsive to manipulation including twisting, bending, pulling, and shrinking and the function control having elements each having a weight and behaving like real-world materials; and
an overflow control formed on a counter arc intersecting the function control at 90 degrees.

12. An interface as recited in claim 11, wherein the function control and overflow control comprise plural controls and the controls are aligned along each arc.

13. An interface as recited in claim 12, wherein a default control is positioned under the cursor at a particular instance.

14. An interface as recited in claim 12, wherein the controls can be one of re-oriented and moved.

15. An interface as recited in claim 12, wherein controls are oriented and shaped to conform to a wrist arc caused by a hand moving about a wrist of the user.

16. An interface as recited in claim 12, wherein the control is oriented to an extended arc.

17. An interface as recited in claim 11, wherein the control comprises plural controls and the shape of the sides of each of the controls is one of rectilinear, arc shaped, wedge shaped and triangular shaped.

18. An interface as recited in claim 11, further comprising an overflow interface positioned responsive to the motion arc.

19. An interface as recited in claim 11, wherein text of the control is rectilinear aligned with a display.

20. An interface as recited in claim 19, wherein the overflow interface is natural motion arc shaped.

21. An interface as recited in claim 11, wherein the cursor is positioned on a touch screen display and the compound motion is performed on the touch screen.

22. A graphical user interface, comprising:
a cursor positioned on a display by a user at a location; and
function controls positioned on the display responsive to the location of the cursor, at least a distance equal to a typical wrist away from a nearest edge of the display, having an interface graphic indicating a function of the controls and having an arc shape conforming to a motion arc of a hand caused by a compound motion of an arm about an elbow of the user and the hand about the wrist of the user, the function controls forming a command strip anchored at a base and responsive to manipulation including twisting, bending, pulling, and shrinking and the controls having elements each having a weight and behaving like real-world materials, wherein a portion of the controls are aligned coincident to an arc intersecting the motion arc at 90 degrees.

23. A graphical user interface for a tablet personal computer having a stylus input system, comprising:
a cursor positioned on a display of the tablet personal computer by a user;
a function control positioned on the display at a location on the display designated by the stylus and at least a distance equal to a typical wrist away from an edge of the display responsive to the location of the cursor, having a interface graphic indicating a function of the control and having a graphic shape and position conforming to a natural motion arc of a hand caused by a compound motion of an arm about an elbow and of the hand moving about a wrist of the user, having plural controls with a default control positioned under the cursor, controls aligned coincident to the arc, the function control forming a command strip anchored at a base and responsive to manipulation including twisting, bending, pulling, and shrinking and function control having elements each having a weight and behaving like real-world materials, and controls aligned along a counter arc intersecting the motion arc at 90 degrees and where the controls are shaped responsive to the natural motion arc with natural variations; and
an overflow interface and shaped positioned responsive to the motion arc.

24. A method, comprising:
determining a position of a cursor as designated by a user;
positioning an arc shaped graphical user interface on a single side of a user and at least a distance equal to a typical wrist away from a nearest edge of the display, and responsive to the position where the arc of the shape is defined by a natural user motion caused by a compound motion of an arm about an elbow of the user and a hand about a wrist of the user, the arc shaped graphic interface having function controls forming a command strip anchored at a base and responsive to manipulation including twisting, bending, pulling, and shrinking and the function controls having elements each having a weight and behaving like real-world materials; and
an overflow control zone formed on a counter arc shaped graphical interface intersecting the arc shaped graphical interface at 90 degrees.

25. A method as recited in claim 24, further comprising determining whether the user has specified a custom arc and positioning one of a custom and standard arc shaped interface responsive to the determination.

26. A computer readable storage for controlling a computer by determining a position of a cursor as designated by the user, positioning an arc shaped graphical user interface on a single side of a user and at least a distance equal to a typical wrist away from a nearest edge of the display, and responsive to the position where the arc of the shape is defined by a natural user motion caused by a compound motion of an arm about an elbow of the user and a hand about a wrist of the user, the arc shaped graphical interface having function controls forming a command strip anchored at a base and responsive to manipulation including twisting, bending, pulling, and shrinking and the function controls having elements each having a weight and behaving like real-world materials, and positioning an overflow control zone formed on a counter arc shaped graphical interface intersecting the arc shaped graphical interface at 90 degrees.

27. A method, comprising:
allowing a user to make strokes with an input device caused by a compound motion of an arm about an elbow of the user and a hand about a wrist of the user with the input device located on a single side of a user;
determining an arc from the strokes;
laying out a first graphical user interface at least a distance equal to a typical wrist away from a nearest edge of a display, including controls, to conform to the arc, the controls forming a command strip anchored at a base and responsive to manipulation including twisting, bending, pulling, and shrinking and the controls having elements each having a weight and behaving like real-world materials; and
laying out a second graphical user interface, including controls, formed on a counter arc intersecting the arc at 90 degrees.

28. A method as recited in claim 27, further comprising:
determining a position of a cursor specified by the user; and
positioning the interface responsive to the position; and
allowing the user to activate a function of the interface.

29. A method, comprising:
allowing a user to make strokes with an input device caused by a compound motion of an arm about an elbow of the user and a hand about a wrist of the user with the input device located on a single side of a user;
determining an arc from the strokes; and
laying out a graphical user interface, including controls, to conform to the arc,
wherein plural users are allowed to make strokes individually at different times and the arc is determined from a combination of strokes of the plural users.

30. An apparatus, comprising:
a display;
a computer producing an arc shaped graphical user interface on the display on a single side of a user and at least a distance equal to a typical wrist away from a nearest edge of the display, where the arc of the shape is defined by a natural user motion caused by a compound motion of an arm about an elbow of the user and a hand about a wrist of the user, the arc shaped graphical interface having function controls forming a command strip anchored at a base and responsive to manipulation including twisting, bending, pulling, and shrinking and the function controls having elements each having a weight and behaving like real-world materials; and
the computer producing a counter arc shaped graphical user interface on the display intersecting the arc shaped graphical interface at 90 degrees and having an overflow control zone.

31. A display, comprising:
a control zone for a function of an interface on a single side of a user and located at least a distance equal to a typical wrist away from a nearest edge of the display, the control zone having function controls forming a command strip anchored at a base and responsive to manipulation including twisting, bending, pulling, and shrinking and the function controls having elements each having a weight and behaving like real-world materials;
an interface element graphic aligned with the control zone and indicating the function with the interface graphic, and the control zone aligned to a natural user compound motion of an elbow motion and a wrist motion; and
an overflow control zone formed on a counter arc intersecting the control zone at 90 degrees.

32. A display as recited in claim 31, wherein a user natural motion stroke comprises one of an a wrist motion curve, a finger motion curve and a shoulder motion in combination with the elbow motion.

33. A display, comprising:
a control zone for a function of an interface and located at least a distance equal to a typical wrist away from a nearest edge of the display, the control zone forming a command strip anchored at a base and responsive to manipulation including twisting, bending, pulling, and shrinking and the control zone having elements each having a weight and behaving like real-world materials;
an interface element graphic aligned with the control zone and indicating the function with the interface graphic, and the control zone only aligned to a natural user motion of independent finger motion; and
an overflow control zone formed on a counter arc and intersecting the control zone at 90 degrees.

34. A display as recited in claim 33, wherein the control zone further comprises a zone access comprising one of an elbow motion curve, a wrist motion curve and a shoulder motion curve in combination with the finger motion.

35. A display on a single side of a user, comprising:
a control zone for a function of an interface on the single side of a user and located at least a distance equal to a typical wrist away from a nearest edge of the display, the control zone forming a command strip anchored at a base and responsive to manipulation including twisting, bending, pulling, and shrinking and the control zone having elements each having a weight and behaving like real-world materials;
an interface element graphic aligned with the control zone and indicating the function with the interface graphic, and the control zone aligned to a natural user motion of a shoulder motion; and
an overflow control zone formed on a counter arc and intersecting the control zone at 90 degrees.

36. A display as recited in claim 35, wherein the user natural motion stroke comprises one of an elbow motion curve, a wrist motion curve and a finger motion curve in combination with the shoulder motion.

37. A method, comprising:
determining a position of a cursor;
positioning an arc shaped graphical user interface on a single side of a user and at least a distance equal to a typical wrist away from a nearest edge of the display and responsive to the position where the arc is defined by a compound natural user motion of a hand when an arm is moved about an elbow of a user and about a wrist of the user, the arc shaped graphical interface having a control zone forming a command strip anchored at a base and responsive to manipulation including twisting, bending, pulling, and shrinking and the control zone having elements each having a weight and behaving like real-world materials; and positioning a counter arc shaped graphical interface to intersect the arc shaped control zone at 90 degrees, the counter arc shaped graphical interface having an overflow control zone.

38. A display, comprising:

an arc shaped control zone for a function of an interface and located at least a distance equal to a typical wrist away from a nearest edge of the display, the arc shaped control zone forming a command strip anchored at a base and responsive to manipulation including twisting, bending, pulling, and shrinking and the control zone having elements each having a weight and behaving like real-world materials;

an arc shaped interface element graphic aligned with the arc shaped control zone and indicating the function with the arc shaped interface graphic, and the arc shaped control zone aligned to a natural user motion produced by only rotation of a user elbow; and an overflow control zone formed on a counter arc shaped interface element graphic intersecting the arc shaped control zone at 90 degrees.

39. A display, comprising:

an arc shaped control zone for a function of an interface and located at least a distance equal to a typical wrist away from a nearest edge of the display, the arc shaped control zone forming a command strip anchored at a base and responsive to manipulation including twisting, bending, pulling, and shrinking and the control zone having elements each having a weight and behaving like real-world materials;

an arc shaped interface element graphic aligned with the arc shaped control zone and indicating the function with the arc shaped interface graphic, and the arc shaped control zone aligned to a natural user motion produced by only rotation of a user wrist; and an overflow control zone formed on a counter arc intersecting the arc shaped control zone at 90 degrees.

40. A display, comprising:

a control zone for a function of an interface and located at least a distance equal to a typical wrist away from a nearest edge of the display, the control zone forming a command strip anchored at a base and responsive to manipulation including twisting, bending, pulling, and shrinking and the control zone having elements each having a weight and behaving like real-world materials;

an interface element graphic aligned with the control zone and indicating the function with the interface graphic, and the control zone aligned to a natural user motion of a static wrist and independent finger motion; and an overflow control zone intersecting the control zone at 90 degrees.

41. A display, comprising:

an arc shaped control zone for a function of an interface and located at least a distance equal to a typical wrist away from a nearest edge of the display, the arc shaped control zone forming a command strip anchored at a base and responsive to manipulation including twisting, bending, pulling, and shrinking and the control zone having elements each having a weight and behaving like real-world materials;

an arc shaped interface element graphic aligned with the arc shaped control zone and indicating the function with the arc shaped interface graphic, and the arc shaped control zone aligned to a natural user motion produced by a concurrent motion of a rotation of the user elbow and rotation of a user wrist; and an overflow control zone formed on a counter arc intersecting the arc shaped control zone at 90 degrees.

* * * * *

UNITED STATES PATENT AND TRADEMARK OFFICE
CERTIFICATE OF CORRECTION

PATENT NO. : 7,663,605 B2  Page 1 of 1
APPLICATION NO. : 10/748684
DATED : February 16, 2010
INVENTOR(S) : George Fitzmaurice et al.

It is certified that error appears in the above-identified patent and that said Letters Patent is hereby corrected as shown below:

Column 4, Line 34, change "plafform" to --platform--.

Column 4, Line 39, change "keyboard" to --keyboard,--.

Column 12, Line 11, change "an a" to --a--.

Signed and Sealed this

Eighteenth Day of May, 2010

David J. Kappos
*Director of the United States Patent and Trademark Office*